United States Patent
Harada et al.

(10) Patent No.: US 11,539,879 B2
(45) Date of Patent: Dec. 27, 2022

(54) IMAGE CAPTURE CONTROL APPARATUS AND IMAGE CAPTURE CONTROL METHOD

(71) Applicant: CANON KABUSHIKI KAISHA, Tokyo (JP)

(72) Inventors: Sayaka Harada, Saitama (JP); Daiyu Ueno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 16/935,581

(22) Filed: Jul. 22, 2020

(65) Prior Publication Data

US 2021/0037181 A1 Feb. 4, 2021

(30) Foreign Application Priority Data

Jul. 30, 2019 (JP) .............................. JP2019-140122
Jul. 30, 2019 (JP) .............................. JP2019-140123

(51) Int. Cl.
*H04N 5/232* (2006.01)
*H04N 5/369* (2011.01)

(52) U.S. Cl.
CPC ......... *H04N 5/23229* (2013.01); *H04N 5/369* (2013.01); *H04N 5/232411* (2018.08)

(58) Field of Classification Search
CPC ............... H04N 5/23229; H04N 5/369; H04N 5/232411; H04N 5/23245; H04N 5/232939; H04N 5/232933; H04N 5/2251; H04N 5/23216; H04N 5/232935; H04N 5/91; G11B 27/031
See application file for complete search history.

(56) References Cited

U.S. PATENT DOCUMENTS

| | | | |
|---|---|---|---|
| 6,285,825 B1 | 9/2001 | Miwa et al. | |
| 8,665,467 B2 * | 3/2014 | Sumi | H04N 1/2307 382/284 |
| 9,374,494 B2 * | 6/2016 | Kubo | H04N 5/2621 |
| 9,544,530 B2 | 1/2017 | Nakajima et al. | |
| 9,990,955 B2 | 6/2018 | Nakajima et al. | |
| 2008/0008441 A1 | 1/2008 | Higashide | |
| 2015/0055932 A1 | 2/2015 | Nakajima et al. | |
| 2017/0047091 A1 | 2/2017 | Nakajima et al. | |

FOREIGN PATENT DOCUMENTS

| | | |
|---|---|---|
| CN | 1252204 A | 5/2000 |
| CN | 104427283 A | 3/2015 |
| CN | 105718524 A | 6/2016 |
| JP | 2012-156587 A | 8/2012 |

\* cited by examiner

*Primary Examiner* — Twyler L Haskins
*Assistant Examiner* — Angel L Garces-Rivera
(74) *Attorney, Agent, or Firm* — Venable LLP

(57) ABSTRACT

An image capture control apparatus includes reception unit configured to receive an instruction for ending recording of a moving image; and control unit configured to, when the instruction for ending is issued, perform control, in a case of a first shooting mode in which an image is displayed in a state being visible from a subject, to display an item for deleting a portion at a beginning or at an end of the moving image, in response to the instruction for ending, and to record the moving image to a recording medium in a state where the portion of the moving image has been deleted, and perform control, in a case of a second shooting mode, to not display the item, even when the instruction for ending has been given.

20 Claims, 14 Drawing Sheets

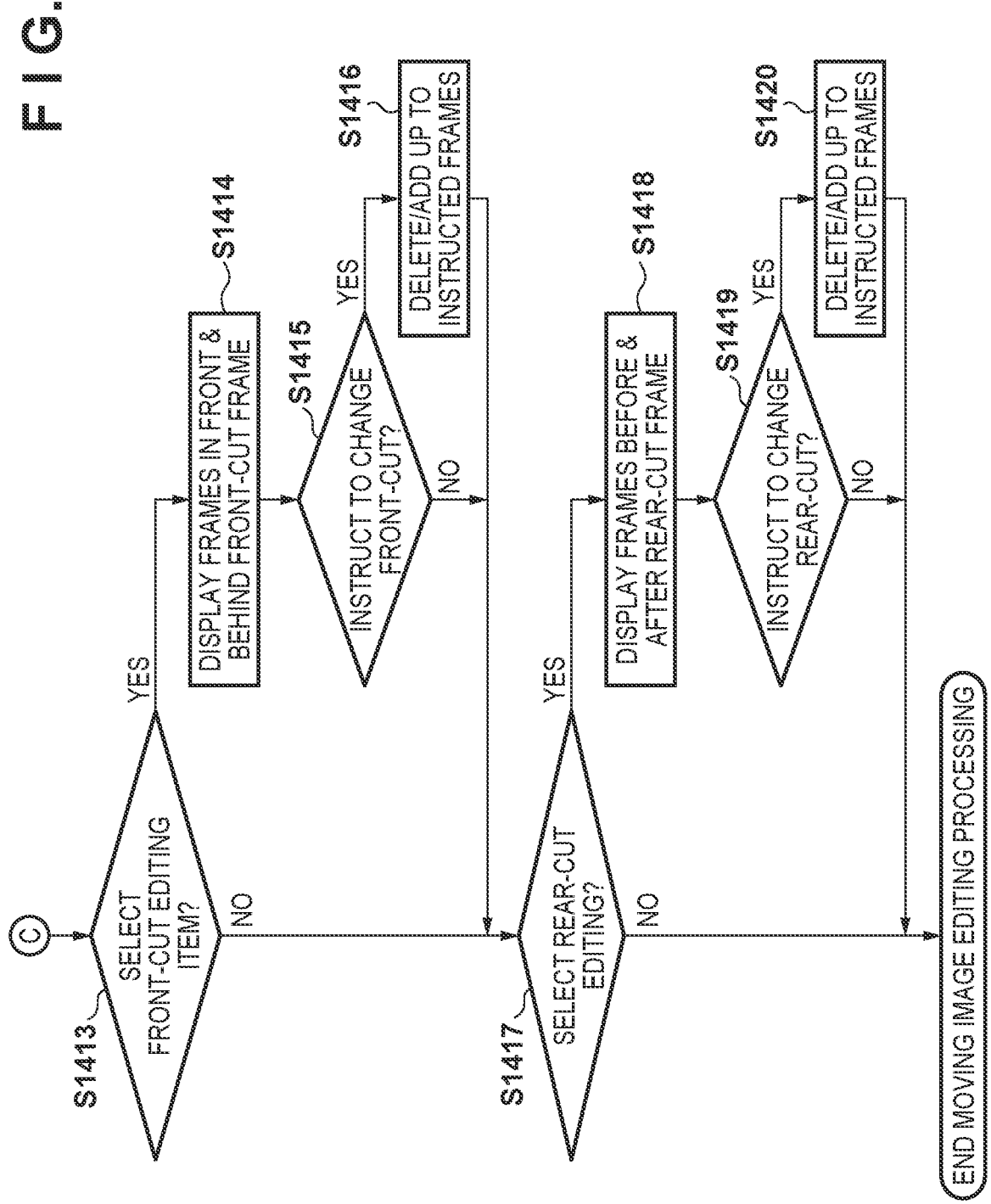

IMAGE CAPTURE CONTROL APPARATUS AND IMAGE CAPTURE CONTROL METHOD

BACKGROUND OF THE INVENTION

Field of the Invention

The present invention relates to a technology for editing moving images.

Description of the Related Art

In recent years, there is increasing opportunity to shoot selfie moving images. In the case of shooting selfie moving images, the user needs to perform operations for instructing the start and end of shooting, which is when a problem arises in that the user operating a button on the camera or operating a remote control at this time appears in the moving image. Such unnecessary portions would desirably not appear in the moving image if possible.

For example, Japanese Patent Laid-Open No. 2012-156587 discloses a technology that enables the user to select whether to include a newly shot moving image in a series of moving images consisting of a plurality of moving images or whether to delete the newly shot moving image from the series of moving images.

However, although Japanese Patent Laid-Open No. 2012-156587 enables the user to select not to include a shot moving image in a series of moving images, the user is not able to delete unnecessary portions appearing at the start and end of shooting of the moving image when they have shot a moving image of themselves.

SUMMARY OF THE INVENTION

The present invention has been made in view of the abovementioned problems, and provides an image capture control apparatus that facilitates deleting unnecessary portions of a moving image, when shooting selfie moving images.

According to a first aspect of the present invention, there is provided an image capture control apparatus comprising: at least one processor or circuit configured to function as: a reception unit configured to receive an instruction for ending recording of a moving image captured by an image capturing device; and a control unit configured to, when the reception unit has received the instruction for ending recording of the moving image, perform control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, in response to an operation on the item, and perform control, in a case of a second shooting mode that differs from the first shooting mode, to not display the item, even when the instruction for ending recording of the moving image has been given.

According to a second aspect of the present invention, there is provided an image capture control apparatus comprising: at least one processor or circuit configured to function as: a reception unit configured to receive an instruction for ending recording of a moving image captured by an image capturing device; and a control unit configured to, when the reception unit has received the instruction for ending recording of the moving image, perform control, in a case of a first shooting mode in which an image captured with the image capturing device is displayed in a state being visible from a subject, to record the moving image together with data corresponding to information indicating to delete a portion of the moving image, being at least one of a portion at a beginning of the moving image and a portion at an end of the moving image, in response to the instruction for ending recording of the moving image being given, and perform control, in a case of a second shooting mode that differs from the first shooting mode, to not record the data together with the moving image, even when the instruction for ending recording of the moving image has been given.

According to a third aspect of the present invention, there is provided an image capture control apparatus comprising: at least one processor or circuit configured to function as: a reception unit configured to receive an instruction for ending recording of a moving image captured by an image capturing device; and a control unit configured to, when the reception unit has received the instruction for ending recording of the moving image, perform control, in a case where shooting by the image capturing device is shooting that satisfies a first condition, to display an item for deleting a portion at a beginning of the moving image, and perform control, in a case where shooting by the image capturing device is shooting that satisfies a second condition, to display an item for deleting a portion at an end of the moving image.

According to a fourth aspect of the present invention, there is provided an image capture control apparatus comprising: at least one processor or circuit configured to function as: a reception unit configured to receive an instruction for ending recording of a moving image captured by an image capturing device; and a control unit configured to, when the reception unit has received the instruction for ending recording of the moving image, perform control, in a case where shooting by the image capturing device is shooting that satisfies a first condition, to record the moving image together with data corresponding to information indicating to delete a portion at a beginning of the moving image, and perform control, in a case where shooting by the image capturing device is shooting that satisfies a second condition, to record the moving image together with data corresponding to information indicating to delete a portion at an end of the moving image.

According to a fifth aspect of the present invention, there is provided an image capture control method comprising: receiving an instruction for ending recording of a moving image captured by an image capturing device; and when the instruction for ending recording of the moving image has been received in the receiving, performing control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, in response to an operation on the item, and performing control, in a case of a second shooting mode that differs from the first shooting mode, to not display the item, even when the instruction for ending recording of the moving image has been given.

According to a 6th aspect of the present invention, there is provided an image capture control method comprising: receiving an instruction for ending recording of a moving image captured by an image capturing device; and when the instruction for ending recording of the moving image has been received in the receiving, performing control, in a case of a first shooting mode in which an image captured with the image capturing device is displayed in a state being visible from a subject, to record the moving image together with data corresponding to information indicating to delete a portion of the moving image, being at least one of a portion at a beginning of the moving image and a portion at an end of the moving image, in response to the instruction for ending recording of the moving image being given, and performing control, in a case of a second shooting mode that differs from the first shooting mode, to not record the data together with the moving image, even when the instruction for ending recording of the moving image has been given.

According to a 7th aspect of the present invention, there is provided an image capture control method comprising: receiving an instruction for ending recording of a moving image captured by an image capturing device; and when the instruction for ending recording of the moving image has been received in the receiving, performing control, in a case where shooting by the image capturing device is shooting that satisfies a first condition, to display an item for deleting a portion at a beginning of the moving image, and performing control, in a case where shooting by the image capturing device is shooting that satisfies a second condition, to display an item for deleting a portion at an end of the moving image.

According to a 8th aspect of the present invention, there is provided an image capture control method comprising: receiving an instruction for ending recording of a moving image captured by an image capturing device; and when the instruction for ending recording of the moving image has been received in the receiving, performing control, in a case where shooting by the image capturing device is shooting that satisfies a first condition, to record the moving image together with data corresponding to information indicating to delete a portion at a beginning of the moving image, and performing control, in a case where shooting by the image capturing device is shooting that satisfies a second condition, to record the moving image together with data corresponding to information indicating to delete a portion at an end of the moving image.

According to a 9th aspect of the present invention, there is provided an image capture control method comprising: receiving an instruction for ending recording of a moving image captured by an image capturing device; and when the instruction for ending recording of the moving image has been received in the receiving, performing control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, together with data corresponding to information indicating to delete the portion of the moving image, in response to an operation on the item, and performing control, in a case of a second shooting mode that differs from the first shooting mode, to not display the item and to not record the data together with the moving image, even when the instruction for ending recording of the moving image has been given.

According to a 10th aspect of the present invention, there is provided an image capture control method comprising: receiving an instruction for ending recording of a moving image captured by an image capturing device; and when the instruction for ending recording of the moving image has been received in the receiving, performing control, in a case where shooting by the image capturing device is shooting that satisfies a first condition, to display an item for deleting a portion at a beginning of the moving image, and to record the moving image together with data corresponding to information indicating to delete the portion at the beginning of the moving image, and performing control, in a case where shooting by the image capturing device is shooting that satisfies a second condition, to display an item for deleting a portion at an end of the moving image, and to record the moving image together with data corresponding to information indicating to delete the portion at the end of the moving image.

According to a 11th aspect of the present invention, there is provided an image capture control apparatus comprising: at least one processor or circuit configured to function as: a reception unit configured to receive an instruction for ending recording of a moving image captured with an image capturing device; and a control unit configured to perform control, in a case of a first shooting mode in which an image captured with the image capturing device is displayed in a state being visible from a subject during shooting of the moving image, to delete a portion at an end of the shot moving image, in response to the reception unit receiving the instruction for ending recording of the moving image, and, in a case of a second shooting mode that differs from the first shooting mode, to not delete the portion at the end of the shot moving image, even when the reception unit has received the instruction for ending recording of the shot moving image.

According to a 12th aspect of the present invention, there is provided an image capture control apparatus comprising: at least one processor or circuit configured to function as: a reception unit configured to receive an instruction for ending recording of a moving image captured with an image capturing device; a self-timer unit configured to delay a recording start of the moving image by a set time period from an instruction for starting recording of the moving image; and a control unit configured to perform control, in a case where shooting of the moving image is performed using the self-timer unit, to not delete a portion at a beginning of the shot moving image, and, in a case where shooting of the moving image is performed without using the self-timer unit, to delete the portion at the beginning of the shot moving image.

According to a 13th aspect of the present invention, there is provided an image capture control apparatus comprising: at least one processor or circuit configured to function as: a reception unit configured to receive an instruction for ending recording of a moving image captured with an image capturing device; and a self-timer unit configured to delay a recording start of the moving image by a set time period from an instruction for starting recording of the moving image; and a control unit configured to perform control, in a case of a first shooting mode in which an image captured with the image capturing device is displayed in a state being visible from a subject during shooting of the moving image, to delete a portion at an end of the shot moving image, in response to the reception unit receiving the instruction for ending recording of the moving image, and, in a case of a second shooting mode that differs from the first shooting mode, to not delete the portion at the end of the shot moving image, even when the reception unit has received the instruction for ending recording of the shot moving image, and for performing control, in a case where shooting of the moving image is performed using the self-timer unit, to not delete a portion at a beginning of the shot moving image, and, in a case where shooting of the moving image is performed without using the self-timer unit, to delete the portion at the beginning of the shot moving image.

According to a 14th aspect of the present invention, there is provided an image capture control method comprising: receiving an instruction for ending recording of a moving image captured with an image capturing device; and performing control, in a case of a first shooting mode in which an image captured with the image capturing device is displayed in a state being visible from a subject during shooting of the moving image, to delete a portion at an end of the shot moving image, in response to the instruction for ending recording of the moving image being received in the reception step, and, in a case of a second shooting mode that differs from the first shooting mode, to not delete the portion at the end of the shot moving image, even when the instruction for ending recording of the shot moving image has been received in the reception step.

According to a 15th aspect of the present invention, there is provided an image capture control method comprising: receiving an instruction for ending recording of a moving image captured with an image capturing device; delaying a recording start of the moving image by a set time period from an instruction for starting recording of the moving image; and performing control, in a case where shooting of the moving image is performed using the delaying, to not delete a portion at a beginning of the shot moving image, and, in a case where shooting of the moving image is performed without using the delaying, to delete the portion at the beginning of the shot moving image.

According to a 16th aspect of the present invention, there is provided an image capture control method comprising: receiving an instruction for ending recording of a moving image captured with an image capturing device; delaying a recording start of the moving image by a set time period from an instruction for starting recording of the moving image; and performing control, in a case of a first shooting mode in which an image captured with the image capturing device is displayed in a state being visible from a subject during shooting of the moving image, to delete a portion at an end of the shot moving image, in response to the instruction for ending recording of the moving image being received in the receiving, and, in a case of a second shooting mode that differs from the first shooting mode, to not delete the portion at the end of the shot moving image, even when the instruction for ending recording of the shot moving image has been received in the receiving, and for performing control, in a case where shooting of the moving image is performed using the delaying, to not delete a portion at a beginning of the shot moving image, and, in a case where shooting of the moving image is performed without using the delaying, to delete the portion at the beginning of the shot moving image.

Further features of the present invention will become apparent from the following description of exemplary embodiments with reference to the attached drawings.

BRIEF DESCRIPTION OF THE DRAWINGS

FIGS. 14A and 14B are flowcharts of moving image editing processing in one embodiment.

DESCRIPTION OF THE EMBODIMENTS

Figure 1A:
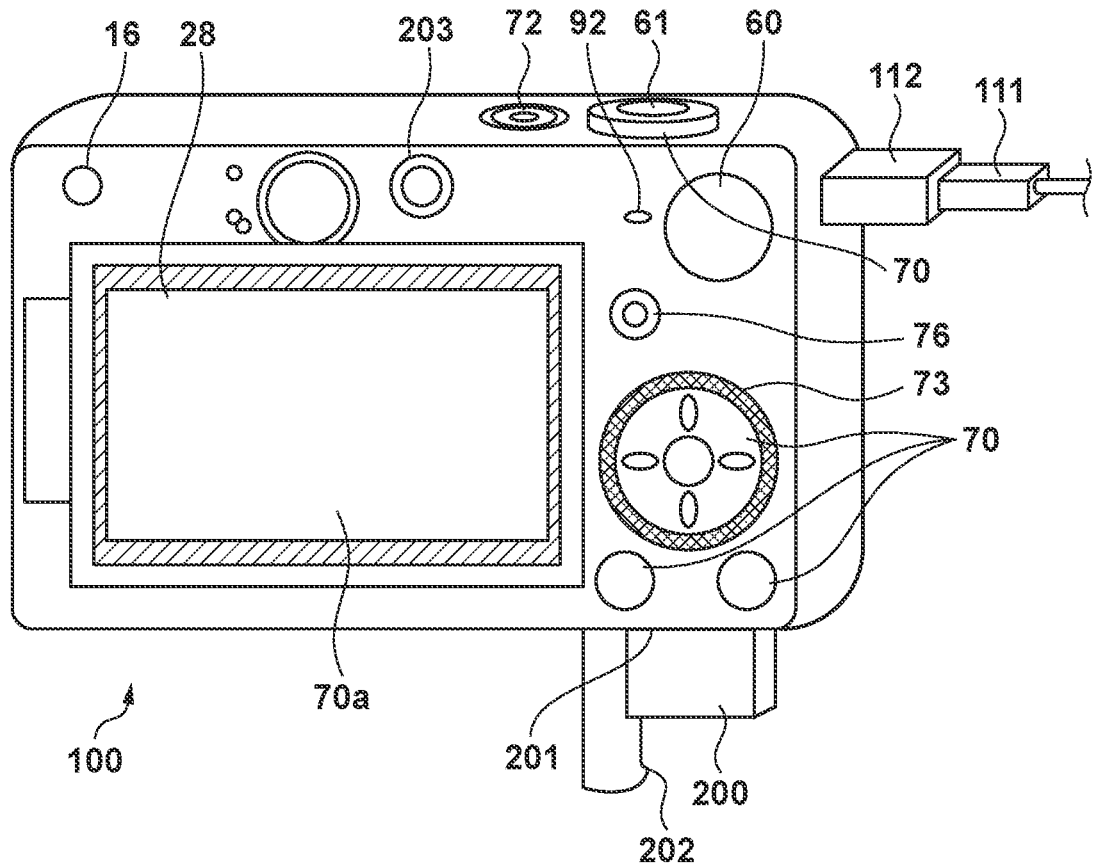
FIGS. 1A and 1B are external views of the back and front of an image capturing apparatus of one embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1B:
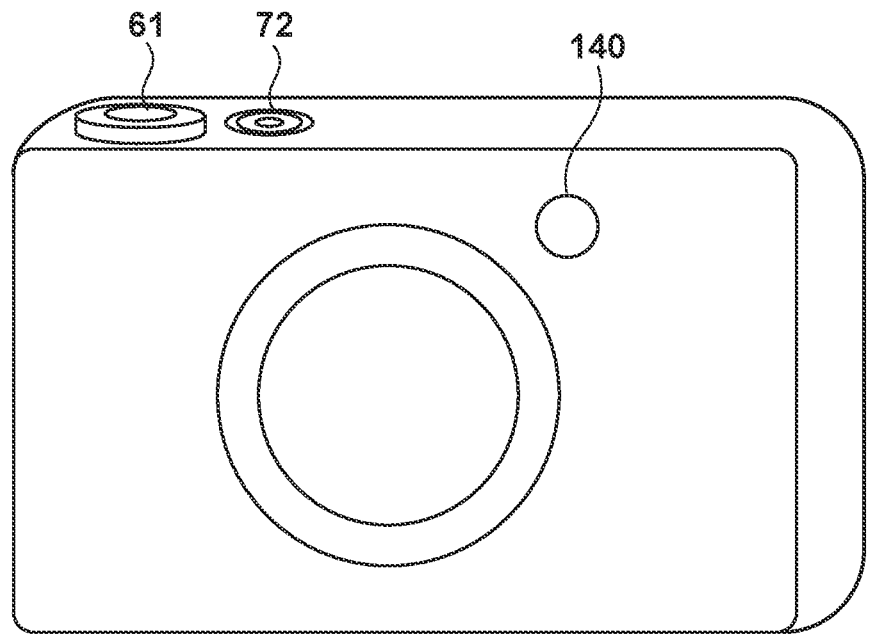

FIGS. 1A and 1B show external views of a digital camera serving as one embodiment of an image capture control apparatus of the present invention.

In FIGS. 1A and 1B, a display unit 28 is a display unit that displays images and various information. A feature of the display unit 28 is being a vari-angle unit that can be opened and oriented toward the subject side. A shutter release 61 is an operation unit for issuing shooting instructions. A mode changeover switch 60 is an operation unit for switching between various modes. A connector 112 is a connector of the digital camera 100 and a connecting cable 111 for connecting to an external device such as a personal computer or a printer.

An operation unit 70 is an operation unit that is formed from operation members such as various switches, buttons and a touch panel that receive various operations from the user. A controller wheel 73 is a rotationally operable operation member that is included in the operation unit 70. A power switch 72 is a press button for switching between power on and power off. The recording medium 200 is a recording medium such as a memory card or a hard disk. A recording medium slot 201 is a slot for housing the recording medium 200. The recording medium 200 housed in the recording medium slot 201 is capable of communicating with the digital camera 100, and is capable of recording and playback. A lid 202 is the lid of the recording medium slot 201. FIG. 1A shows a state in which the lid 202 is open and the recording medium 200 is partially removed from the slot 201 and exposed.

A light-emitting unit 140 is constituted by an LED (light emitting diode) or the like, and notifies an operating state (e.g., self-timer countdown, shooting start, etc.) of the digital camera 100 to a subject located on the front side of the camera with a predetermined pattern of light emission/non-emission. The light-emitting unit 140 is disposed on the front of the camera (subject side, image capturing surface side) so as to be visibly recognizable from the subject side. A moving image button 76 is used to instruct start and stop of moving image shooting (recording).

A speaker 92 notifies the operating state (e.g., self-timer countdown, shooting start, etc.) of the digital camera 100 to the subject by emitting a buzzer sound or the like. A sub-camera 203 is disposed on the back of the camera in order for the image taker to takes selfies of himself or herself. A microphone 16 is one audio input means, and it is possible to control the camera by notifying audio for causing various operations to be performed and settings to be configured.

Figure 2:
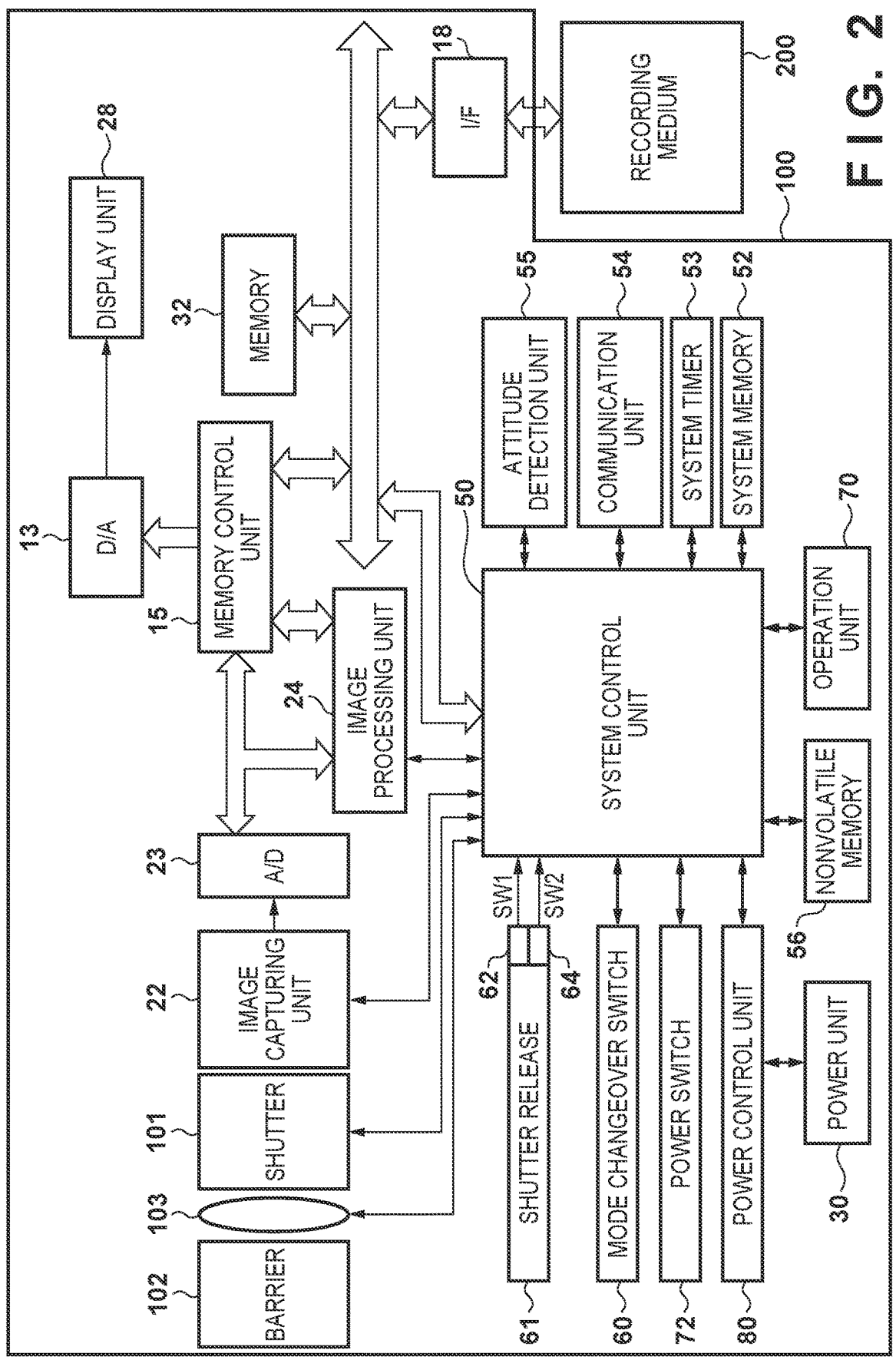
FIG. 2 is a block diagram showing a configuration of the image capturing apparatus of one embodiment.

FIG. 2 is a block diagram showing an example configuration of the digital camera 100 of the present embodiment. In FIG. 2, a taking lens 103 is a lens group that includes a zoom lens and a focus lens. A shutter 101 is a shutter provided with an aperture function. An image capturing unit 22 is an image sensor that is constituted by a CCD sensor, a CMOS sensor or the like that converts optical images into electrical signals. An A/D converter 23 converts analog signals into digital signals. The A/D converter 23 is used in order to convert analog signals that are output by the image capturing unit 22 into digital signals. A barrier 102 prevents an image capturing system of the digital camera 100 that includes the taking lens 103, the shutter 101 and the image capturing unit 22 from being contaminated or damaged, by covering the image capturing system including the taking lens 103.

An image processing unit 24 performs color conversion processing and resize processing such as predetermined pixel interpolation and reduction on data from the A/D converter 23 or data from a memory control unit 15. Also, the image processing unit 24 performs predetermined computation processing using captured image data. Based on the computation result obtained by the image processing unit 24, a system control unit 50 performs exposure control and ranging control. TTL (through-the-lens) AF (auto-focus) processing, AE (auto-exposure) processing and EF (pre-flash emission) processing are thereby performed. The image processing unit 24 further performs predetermined computation processing using captured image data, and performs through-the-lens AWB (auto white balance) processing based on the obtained computation result.

The output data from the A/D converter 23 is written to a memory 32 via the image processing unit 24 and the memory control unit 15 or directly via the memory control unit 15. The memory 32 stores image data obtained by the image capturing unit 22 and converted into digital data by the A/D converter 23, and image data for display on the display unit 28. The memory 32 is provided with sufficient storage capacity to store a predetermined number of still images or moving images and audio of predetermined length.

The memory 32 also serves as a memory (video memory) for image display. A D/A converter 13 converts data for image display that is stored in the memory 32 into analog signals and supplies the analog signals to the display unit 28. Image data for display written in the memory 32 is thus displayed by the display unit 28 via the D/A converter 13. The display unit 28 performs the display that depends on the analog signals from the D/A converter 13 on a display device such as an LCD. As a result of digital signals obtained through A/D conversion by the A/D converter 23 and stored in the memory 32 undergoing analog conversion by the D/A converter 13 and being sequentially transferred to the display unit 28 and displayed, the display unit 28 is able to function as an electronic viewfinder and perform through image display (live view display (LV display)). Hereinafter, images that are displayed with live view will be referred to as LV images.

A nonvolatile memory 56 is a memory serving as an electrically erasable and recordable recording medium, and an EEPROM, for example, is used. The nonvolatile memory 56 stores constants, programs and the like for use in operations of the system control unit 50. Programs as referred to here are computer programs for executing various flowcharts which will be discussed later in the present embodiment.

The system control unit 50 is a control unit that has at least one processor or circuit, and performs overall control of the digital camera 100. By executing programs recorded in the aforementioned nonvolatile memory 56, the system control unit 50 realizes the various processing of the present embodiment which will be discussed later. A RAM, for example, is used for the system memory 52. Constants and variables for use in operations of the system control unit 50, programs read out from the nonvolatile memory 56 and the like are expanded in the system memory 52. The system control unit 50 also performs display control by controlling the memory 32, the D/A converter 13, the display unit 28 and the like.

A system timer 53 is a clocking unit that measures the time used in various controls and the time of a built-in clock.

The mode changeover switch 60, the shutter release 61 and the operation unit 70 are operation means for inputting various operating instructions to the system control unit 50. The mode changeover switch 60 switches the operating mode of the system control unit 50 to any of a still image recording mode, a PMA (plus movie auto) mode, a moving image shooting mode, a playback mode and the like. As modes that are included in the still image recording mode there are an auto shooting mode, an auto scene recognition mode, a manual mode, an aperture priority mode (Av mode), a shutter priority mode (Tv mode), and programmed AE mode. Also, there are various scene modes that are shooting scene-specific shooting settings, custom modes, and the like. Using the mode changeover switch 60, the user is able to directly switch to any of these modes. Alternatively, a configuration may be adopted in which, after switching to a shooting mode list screen with the mode changeover switch 60, one of the displayed modes is selected, and the selected mode is switched to using another operation member. Similarly, the moving image shooting mode may also include a plurality of modes.

A first shutter switch 62 turns on with a so-called half press (shooting preparation instruction) when the shutter release 61 provided in the digital camera 100 has been partially operated, and produces a first shutter switch signal SW1. Due to the first shutter switch signal SW1, operations such as AF (auto-focus) processing, AE (auto-exposure) processing, AWB (auto white balance) processing, EF (pre-flash emission) processing and the like are started.

A second shutter switch 64 turns on with a so-called full press (shooting instruction) when the shutter release 61 is fully operated, and produces a second shutter switch signal SW2. The system control unit 50, due to the second shutter switch signal SW2, starts operation of a series of shooting processing from readout of signals from the image capturing unit 22 to writing of image data to the recording medium 200.

The various operation members of the operation unit 70 are allocated functions as appropriate on a scene-by-scene basis and operate as various function buttons, due to operations selecting various function icons that are displayed on the display unit 28. As function buttons there are, for example, a finish button, a back button, an image send button, a jump button, a depth-of-field preview button, an attribute change button, and the like. For example, when a menu button is pressed, a menu screen with various settings is displayed on the display unit 28. The user is able to intuitively configure various settings using the menu screen displayed on the display unit 28, a four-way button and a set button.

The controller wheel 73 (see FIG. 1A) is a rotationally operable operation member included in the operation unit 70, and is, for instance, used together with the four-way button when instructing a selection item. When the controller wheel 73 is rotationally operated, an electrical pulse signal is produced according to the operation amount, and the system control unit 50 controls the constituent elements of the digital camera 100 based on this pulse signal. This pulse signal enables the angle at which the controller wheel 73 was rotationally operated, the number of rotations and the like to be determined. Note that the controller wheel 73 may be any operation member whose rotational operation can be detected. For example, the controller wheel 73 may be a dial-operated member that itself rotates and produces a pulse signal in response to being rotationally operated by a user. Also, the controller wheel 73 may be an operation member constituted by a touch sensor (so-called touch wheel) that detects a rotational operation by the user's finger on the controller wheel 73 rather than rotating itself.

The power control unit 80 is constituted by a battery detection circuit, a DC-DC converter, a switch circuit that switches the blocks that are energized and the like, and detects whether or not a battery is installed, the type of battery, and the remaining battery. Also, the power control unit 80 controls the DC-DC converter based on the detection result and instructions from the system control unit 50, and supplies the required voltage to the constituent elements including the recording medium 200 for the required period. A power unit 30 is constituted by a primary battery such as an alkaline battery or a lithium battery, a secondary battery such as a NiCd battery, a NiMH battery or a Li-ion battery, an AC adaptor, and the like.

A recording medium I/F 18 is an interface with a recording medium 200 such as a memory card or a hard disk. The recording medium 200 is a recording medium such as a memory card for recording shot images, and is constituted by a semiconductor memory, an optical disk, a magnetic disk, or the like.

A communication unit 54 connects wirelessly or by cable, and transmits and receives image signals, audio signals, and the like. The communication unit 54 is also capable of connecting to a wireless LAN (Local Area Network) and the Internet. The communication unit 54 is capable of transmitting images (including through images) captured by the image capturing unit 22 and images recorded on the recording medium 200, and is able to receive image data and various other information from an external device.

An attitude detection unit 55 detects the attitude of the digital camera 100 relative to the gravity direction. Based on the attitude detected by the attitude detection unit 55, it can be discriminated whether the image shot by the image capturing unit 22 is as an image shot with the digital camera 100 oriented horizontally or is an image shot with the digital camera 100 oriented vertically. The system control unit 50 can perform processing such as adding orientation information that depends on the attitude detected by the attitude detection unit 55 to the image files of images captured by the image capturing unit 22, and rotating and recording images. An acceleration sensor, a gyro sensor or the like can be used as the attitude detection unit 55. It is also possible to detect the motion (pan, tilt, lift, stationary, etc.) of the digital camera 100, using an acceleration sensor, a gyro sensor or the like serving as the attitude detection unit 55.

Note that a touch panel 70a (see FIG. 1A) capable of detecting contact on the display unit 28 is provided as one operation unit 70. The touch panel 70a and the display unit 28 can be constituted integrally. For example, the touch panel 70a is constituted so as to prevent the transmissivity of light obstructing display on the display unit 28, and is attached to the top layer of the display surface of the display unit 28. Input coordinates on the touch panel 70a are associated with display coordinates on the display screen of the display unit 28. A GUI (graphical user interface) that make it appear as though the user is directly operating the screen displayed on the display unit 28 is thereby provided. The system control unit 50 is able to detect the following operations on the touch panel 70a or states thereof.

A finger or pen that was not touching the touch panel 70a newly touching the touch panel 70a. That is, the start of touching (hereinafter, touch-down).

A state where a finger or pen is touching the touch panel 70a (hereinafter, touch-on).

Movement of a finger or pen while still touching the touch panel 70a (hereinafter, touch-move).

Lifting of a finger or pen that was touching the touch panel 70a. That is, the end of touching (hereinafter, touch-up).

A state where nothing is touching the touch panel 70a (hereinafter, touch-off).

When touch-down is detected, touch-on is also detected at the same time. After touch-down, touch-on normally continues to be detected as long as touch-up is not detected. Touch-move is also detected in a state where touch-on is detected. Even when touch-on is detected, touch-move is not detected if the touch position has not moved. Touch-off is achieved after detecting that all fingers and pens that were touching have touched up.

These operations and states and the position coordinates where a finger or pen touches the touch panel 70a are notified to the system control unit 50 through an internal bus, and the system control unit 50 determines what type of operation (touch operation) was performed on the touch panel 70a based on the notified information. With regard to a touch-move, the movement direction of a finger or pen that moves on the touch panel 70a can also be determined for every vertical component and horizontal component on the touch panel 70a, based on changes in the position coordinates. In the case where a touch-move of a predetermined distance or more is detected, it is determined that a slide operation was performed. An operation that involves very quickly moving a finger a certain distance while still touching the touch panel and then directly lifting the finger is called a flick. A flick is, in other words, an operation involving very quickly tracing a finger over the touch panel 70a as if flicking the touch panel 70a. It can be determined that a flick was performed when a touch-move of a predetermined distance or more being performed at a predetermined speed or more is detected and then a touch up is directly detected (it can be determined there was a flick following a slide operation).

Furthermore, touch operations that involve touching a plurality of locations (e.g., two points) at the same time and moving the touch positions closer together or moving the touch positions further apart are respectively called a pinch-in and a pinch-out. The pinch-out and pinch-in are collectively referred to as a pinch operation (or simply a pinch).

The touch panel 70a may use a touch panel employing any of various systems such as a resistive membrane system, a capacitive sensing system, a surface elastic wave system, an infrared system, an electromagnetic induction system, an image recognition system, and an optical sensor system. While there are systems that detect a touch when there is contact with the touch panel and systems that detect a touch when a finger or pen approaches the touch panel, either system may be adopted.

Also, the present invention is applicable not only to an image capturing apparatus but also to a control device that communicates with an image capturing apparatus (including a network camera) via wired or wireless communication and controls the image capturing apparatus remotely. As devices that control an image capturing apparatus remotely there are smartphones, tablet PCs, desktop PCs and remote controls, for example. An image capturing apparatus can be controlled remotely, by notifying commands for performing various operations and configuring settings to the image capturing apparatus from the control device side, based on operations performed on the control device side and processing performed on the control device side. Also, a configuration may be adopted that enables live view images shot with the image capturing apparatus to be received via wired or wireless communication and displayed on the control device side.

Figure 3:
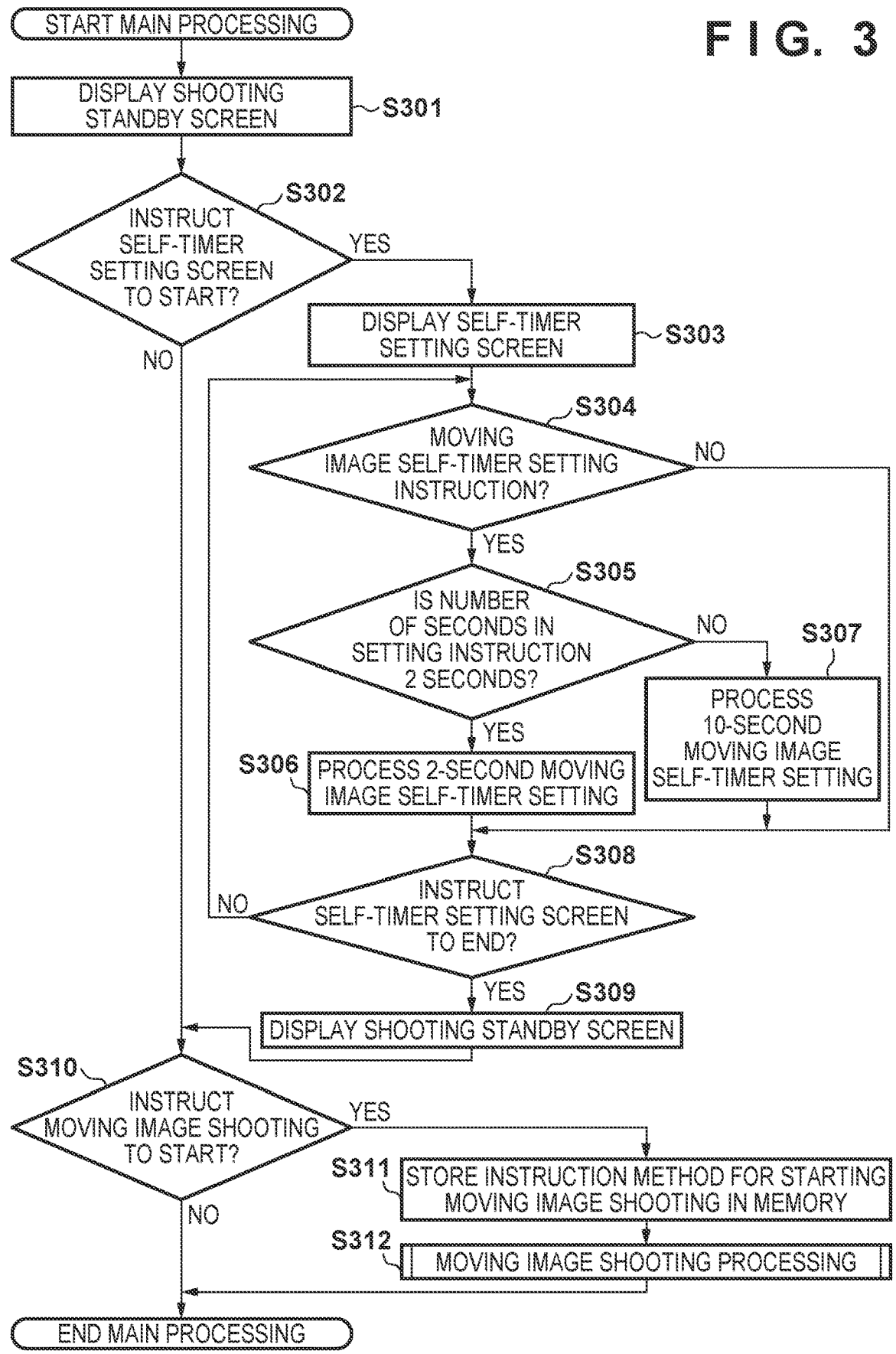
FIG. 3 is a flowchart of main processing in one embodiment.

FIG. 3 is a flowchart showing a series of operations (main processing) from setting of the moving image self-timer to completion of moving image shooting in the present embodiment. Note that the moving image self-timer operation is an operation for starting moving image shooting automatically, after waiting (holding) for the time set in the self-timer from when a self-timer countdown instruction is given by the user.

The various processing in FIG. 3 is realized by a program stored in the nonvolatile memory 56 being expanded in the system memory 52 and executed by the system control unit 50. Note that this processing is started when the digital camera 100 is powered on and the moving image shooting mode is set.

In step S301, the system control unit 50 displays a shooting standby screen of the moving image shooting mode on the display unit 28.

Figure 4:
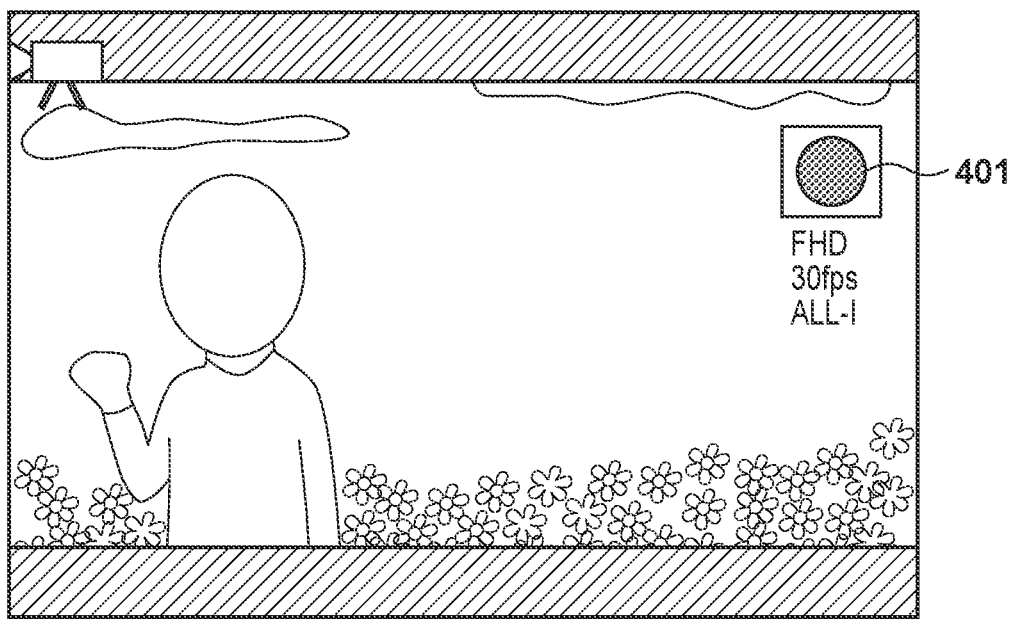
FIG. 4 is a diagram showing a shooting standby screen in a moving image shooting mode in one embodiment.

Here, FIG. 4 is a diagram showing an example of the shooting standby screen of the moving image shooting mode that is displayed on the display unit 28 in the present embodiment, with reference numeral 401 denoting an example of a touch item for instructing the start of moving image shooting.

In step S302, the system control unit 50 determines whether an instruction for starting self-timer setting of the moving image shooting mode has been given. If the instruction for starting self-timer setting of the moving image shooting mode, that is, an instruction for displaying a self-timer setting screen of the moving image shooting mode in the present embodiment, has been given, the processing advances to step S303, and if this instruction has not been given, the processing advances to step S310. In the present embodiment, setting items relating to the self-timer may be provided within a menu screen, and the self-timer setting screen may be displayed in response to a corresponding setting item being selected. Also, a configuration may be adopted in which an item for changing the self-timer is displayed on the shooting standby screen, and the self-timer can be set in response to the item being selected with a touch operation or a button operation.

Figure 5:
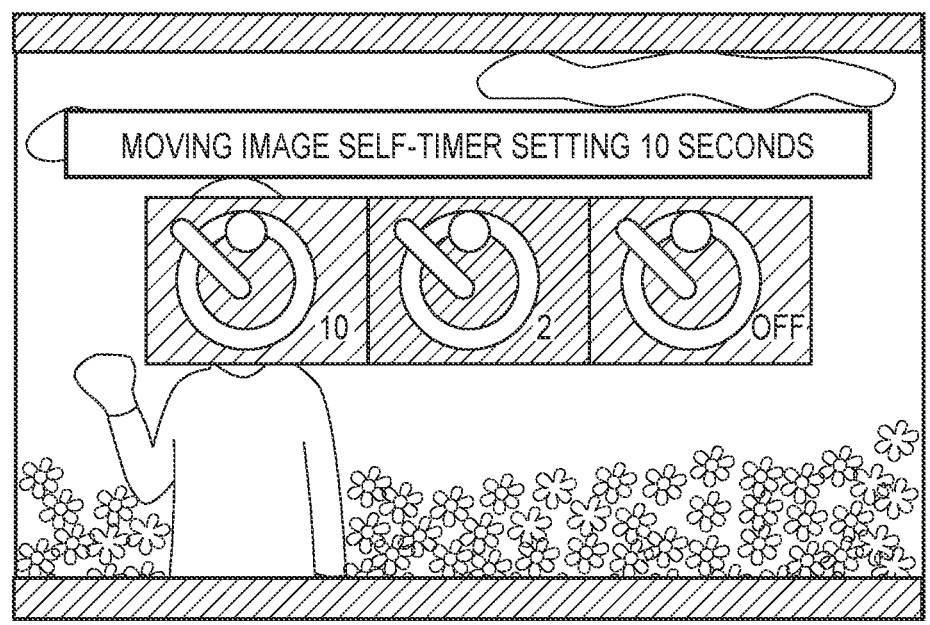
FIG. 5 is a diagram showing a self-timer setting screen in the moving image shooting mode in one embodiment.

In step S303, the system control unit 50 displays the self-timer setting screen of the moving image shooting mode on the display unit 28. Here, FIG. 5 is a diagram showing an example of the self-timer setting screen for moving image shooting that is displayed on the display unit 28 in the present embodiment, with setting items relating to the self-timer being displayed in a superimposed manner on the live view image. Note that, in the present embodiment, the setting durations of the self-timer are given as 2 seconds, 10 seconds, or OFF (0 sec), but a configuration may be adopted in which other candidate durations are given as fixed values or customization for allowing the user to set the duration is selectable.

In step S304, the system control unit 50 determines whether an instruction for setting the moving image self-timer has been given. If the instruction for setting the moving image self-timer has been given, the processing advances to step S305, and if this instruction has not been given, that is, if OFF has been selected, the processing advances to step S308.

In step S305, the system control unit 50 determines whether the duration instructed for setting the moving image self-timer is 2 seconds. If the duration instructed for setting the moving image self-timer is 2 seconds, the processing advances to step S306, and if the instructed duration is not 2 seconds, that is, if the instructed time is 10 seconds, the processing advances to step S307.

In step S306, the system control unit 50 sets the duration of the moving image self-timer to 2 seconds. In step S307, the system control unit 50 sets the duration of the moving image self-timer to 10 seconds.

In step S308, the system control unit 50 determines whether an end instruction of the self-timer setting screen has been given. The end instruction of the self-timer setting screen may be given in response to a setting candidate of the self-timer being selected in step S304, or may be given in response to the finish button included in the operation unit 70 being pressed or a menu button being pressed after the self-timer has been set. If the end instruction of the self-timer setting screen has been given, the processing advances to step S309, and if the end instruction has not been given, the processing returns to step S304.

In step S309, the system control unit 50 displays the shooting standby screen on the display unit 28, similarly to step S301.

In step S310, the system control unit 50 determines whether a moving image shooting start instruction has been given. If the moving image shooting start instruction (recording start instruction) has been given, the processing advances to step S311, and if this instruction has not been given, the processing is ended.

In step S311, the system control unit 50 stores a specific instruction method for starting moving image shooting performed in step S310 in the memory 32. Note that specific instruction methods for starting moving image shooting include touching the moving image touch item 401, pressing the moving image button 76, a start instruction from a remotely located control device such as a smartphone, a tablet PC, a desktop PC or a remote control, and a start instruction given by audio input with the microphone 16. Note that the instruction methods for starting moving image shooting given as examples here are only examples, and moving image shooting start can be instructed by other methods.

Figure 6:
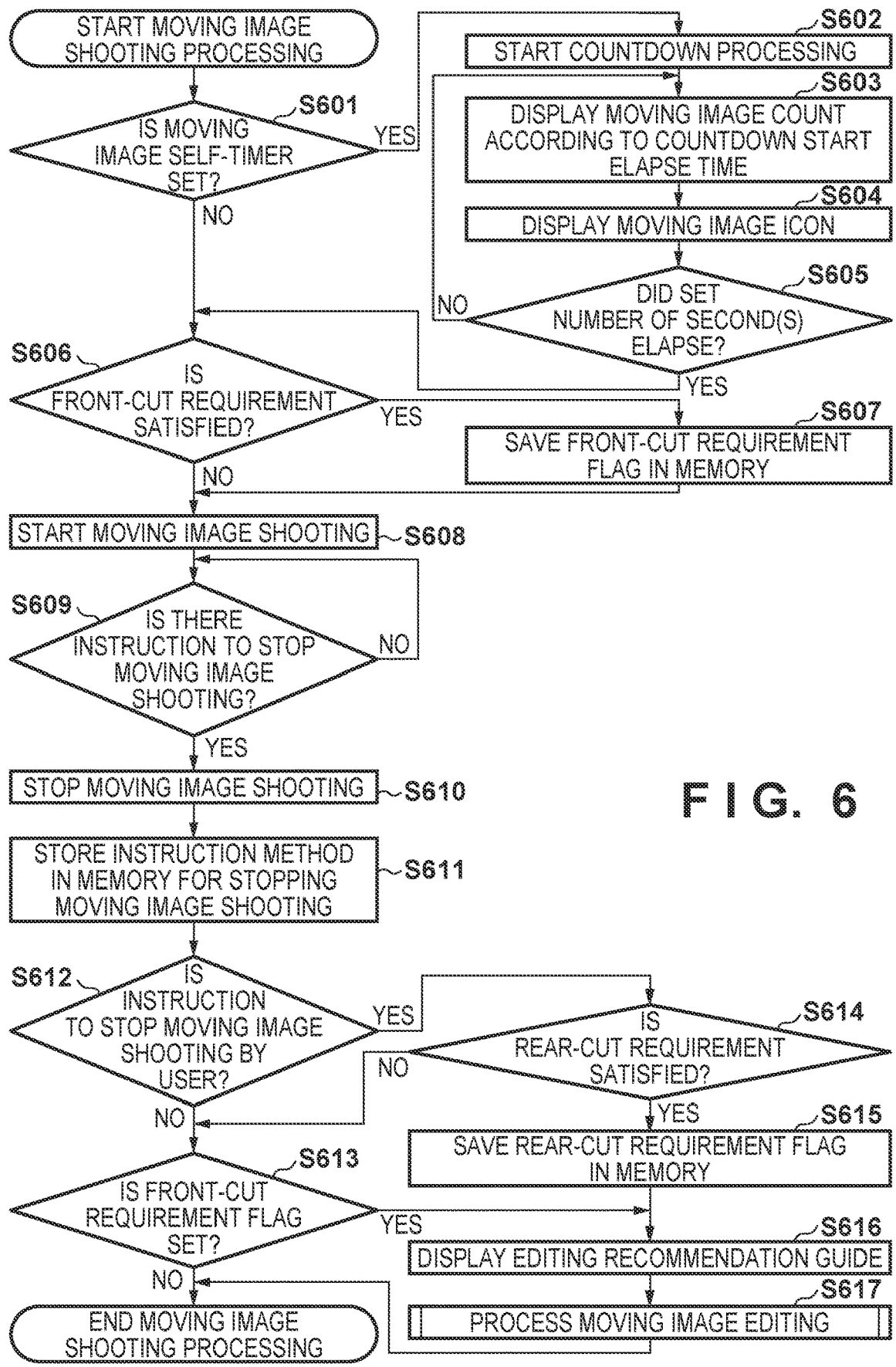
FIG. 6 is a flowchart of moving image shooting processing in one embodiment.

In step S312, the system control unit 50 executes moving image shooting processing which was described with FIG. 6.

Hereinafter, the operations of the moving image shooting processing in step S312 will be described, with reference to FIG. 6. FIG. 6 is a flowchart showing the operations from instructing moving image shooting start and starting the count of the moving image self-timer is started until completion of moving image shooting in the present embodiment.

This processing is realized by a program recorded in the nonvolatile memory 56 being expanded in the system memory 52 and executed by the system control unit 50. Note that this processing is started when the digital camera 100 is powered on and the processing transitions to step S312.

In step S601, the system control unit 50 determines whether the moving image self-timer is set to other than OFF. That is, the system control unit 50 determines whether the self-timer is set to a duration such as 2 seconds or 10 seconds that is not 0 seconds. If it is determined that the moving image self-timer is set to other than OFF, the processing advances to step S602, and if it is determined that the moving image self-timer is set to OFF, the processing advances to step S606.

In step S602, the system control unit 50 starts countdown processing of the moving image self-timer.

Figure 7:
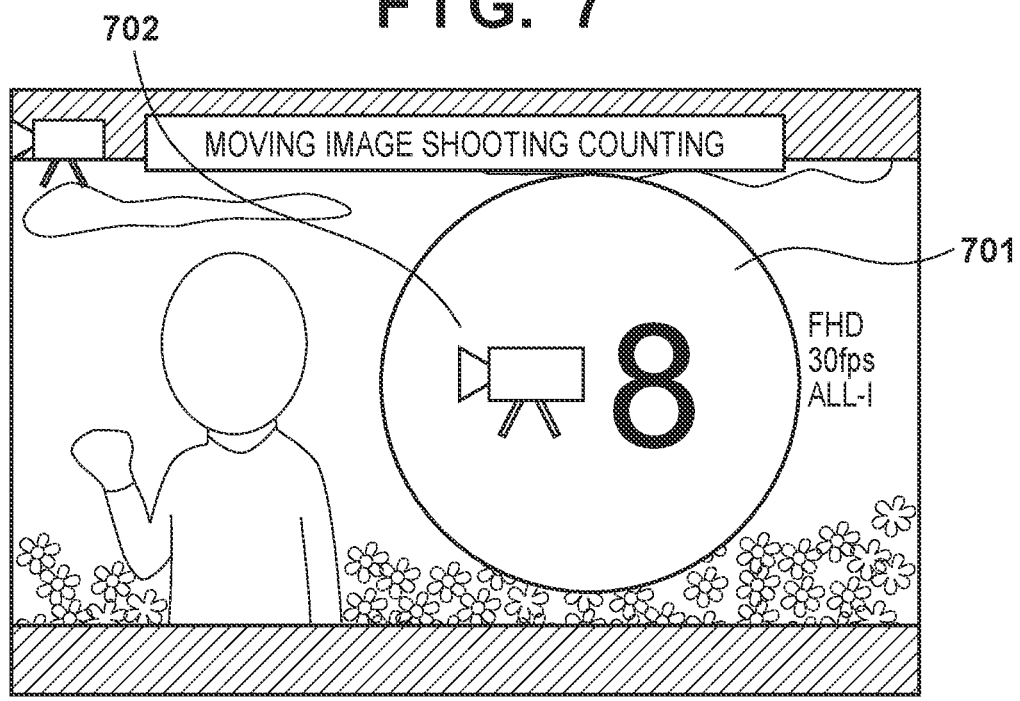
FIG. 7 is a diagram showing a screen during a self-timer count in the moving image shooting mode in one embodiment.

In step S603, the system control unit 50 displays the moving image self-timer count on the display unit 28 with the elapse of the countdown time of the moving image self-timer. Here, FIG. 7 is a diagram showing an example of the screen during counting of the moving image self-timer that is displayed on the display unit 28 in the present embodiment, with reference numeral 701 denoting an example of moving image self-timer count display.

In step S604, the system control unit 50 displays a moving image icon on the display unit 28. Reference numeral 702 in FIG. 7 denotes an example of moving image icon display that is displayed on the display unit 28 in the present embodiment, with this icon appearing simultaneously with the count start, and not being displayed on the shooting standby screen in FIG. 4.

In step S605, the system control unit 50 determines whether the set duration has elapsed from when countdown was started. If the set duration has elapsed from when countdown was started, the processing advances to step S606, and if the set duration has not elapsed, the processing returns to step S603.

In step S606, the system control unit 50 determines whether a front-cut requirement for deleting a fixed number of frames from the head of the shot moving image is satisfied. If the front-cut requirement for deleting a fixed number of frames from the head (one of the beginning and the end) of the shot moving image is satisfied, the processing advances to step S607, and if the front-cut requirement is not satisfied, the processing advances to step S608.

Here, shooting with the self-timer OFF, shooting in selfie mode, shooting with the sub-camera 203, shooting with the vari-angle unit oriented toward the subject side, the operation unit for starting moving image shooting being located on the subject side and the like are given as front-cut requirements. The front-cut requirement may be regarded as being satisfied if one of the above requirements determined in advance is satisfied, or the front-cut requirement may be regarded as being satisfied if a number of the above requirements determined in advance are satisfied.

In step S607, the system control unit 50 stores a flag indicating that the front-cut requirement for deleting a fixed number of frames from the head of the shot moving image is satisfied in the memory 32.

Figure 8:
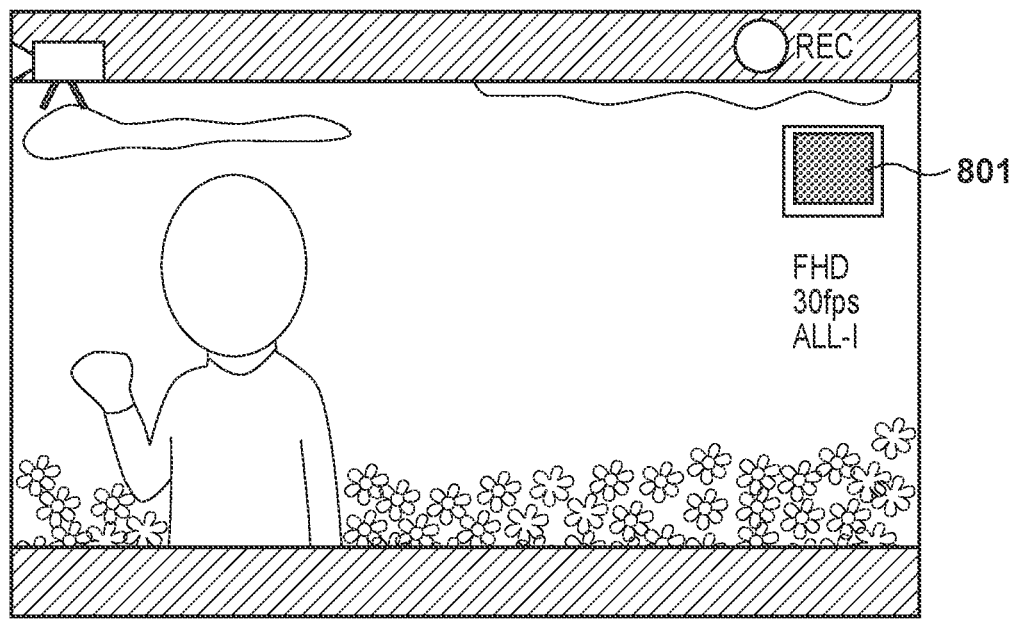
FIG. 8 is a diagram showing a screen during moving image shooting in the moving image shooting mode in one embodiment.

In step S608, the system control unit 50 performs signal readout from the image capturing unit 22, and starts moving image shooting for recording. Here, FIG. 8 is a diagram showing an example of a screen during moving image shooting that is displayed on the display unit 28 in the present embodiment, with reference numeral 801 denoting an example of a touch item for instructing stopping of moving image shooting.

In step S609, the system control unit 50 determines whether the moving image shooting stop instruction (recording end instruction) has been given. If the moving image shooting stop instruction has been given, the processing advances to step S610, and if this instruction has not been given, moving image shooting is continued without interruption.

In step S610, the system control unit 50 performs moving image shooting stop processing such as processing for stopping signal readout from the image capturing unit 22 and image creation processing of a moving image to be written to the recording medium 200 with the captured images as a video file.

In step S611, the system control unit 50 stores the specific instruction method of the moving image shooting stoppage performed in step S609 in the memory 32. Specific instruction methods for stopping moving image shooting include manually touching the moving image touch item 801, pressing the moving image button 76, a stop instruction from a remotely located control device such as a smartphone, a tablet PC, a desktop PC or a remote control, and a stop instruction by a user operation such as a stop instruction given by audio input with the microphone 16. Also, stop instructions other than by a user operation are also conceivable, such as automatic stopping of moving image shooting in a mode in which recording is performed for a shooting time that is set beforehand in addition to stoppage by a user operation, or automatic stopping of moving image shooting on detection of card full, size full or buffer full. Note that the instruction method for stopping moving image shooting given as examples are only examples, and it is also possible to instruct stopping of moving image shooting by other methods.

In step S612, the system control unit 50 determines whether the instruction for stopping moving image shooting was given by a user operation. If the instruction for stopping moving image shooting was given by a user operation, the processing advances to step S614, and if the stop instruction was not given by a user operation, the processing advances to step S613.

In step S613, the system control unit 50 determines whether the front-cut requirement flag for deleting a fixed number of frames from the head of the shot moving image is saved in the memory 32. If the front-cut requirement flag for deleting a fixed number of frames from the head of the shot moving image is saved in the memory 32, the processing advances to step S616, and if this is not the case, the processing is ended.

In step S614, the system control unit 50 determines whether a rear-cut requirement for deleting frames of a fixed length from the tail (end) of the shot moving image is satisfied. If the rear-cut requirement for deleting frames of a fixed length from the tail of the shot moving image is satisfied, the processing advances to step S615, and if the rear-cut requirement is not satisfied, the processing advances to step S613. Note that stopping of the moving image being instructed by an operation member of the digital camera 100, shooting in selfie mode, shooting with the sub-camera 203, the vari-angle unit being oriented toward the subject side, the operation unit for stopping moving image shooting being located on the subject side and the like are given as rear-cut requirements. Note that the rear-cut requirement may be regarded as not being satisfied, in the case where recording of a moving image is stopped due to a recording time of the moving image being set in advance by the user before shooting or the user performing a predetermined gesture (such as waving a hand, showing the palm of his or her hand, or other actions). In such cases, the user approaching the digital camera 100 and operating the operation unit 70 in order to instruct stopping of the moving image does not appear in the moving image. Alternatively, in the case of a gesture, the time that is cut off may be shortened, assuming the determination of step S614 is YES.

In step S615, the system control unit 50 stores a flag indicating that the rear-cut requirement for deleting frames of a fixed length from the tail of the shot moving image is satisfied in the memory 32.

Figure 9A:
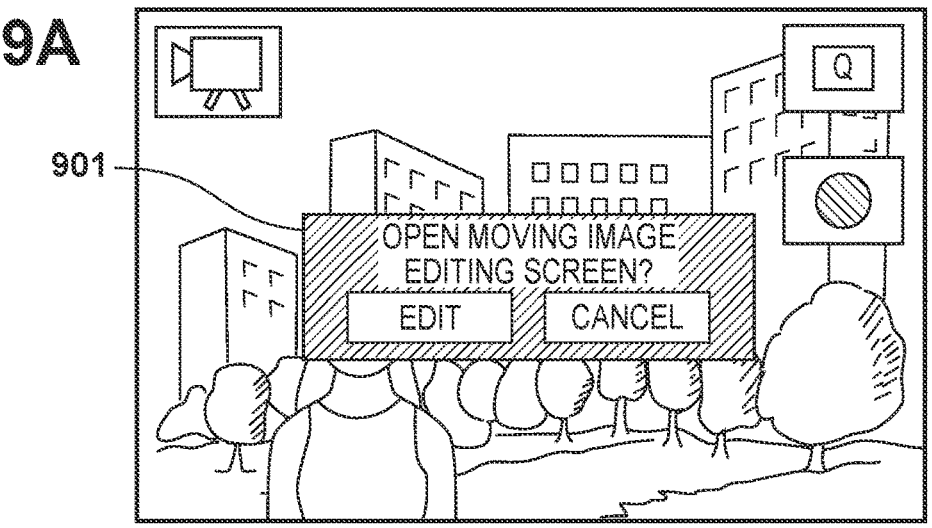
FIGS. 9A to 9C are diagrams showing moving image editing guidance that is displayed during moving image shooting stoppage in one embodiment.
Figure 9B:
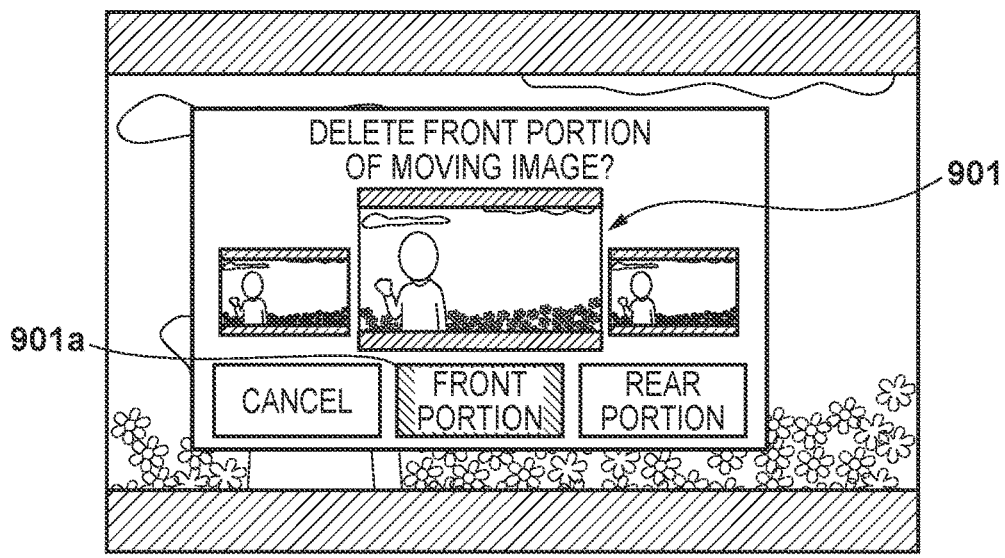
Figure 9C:
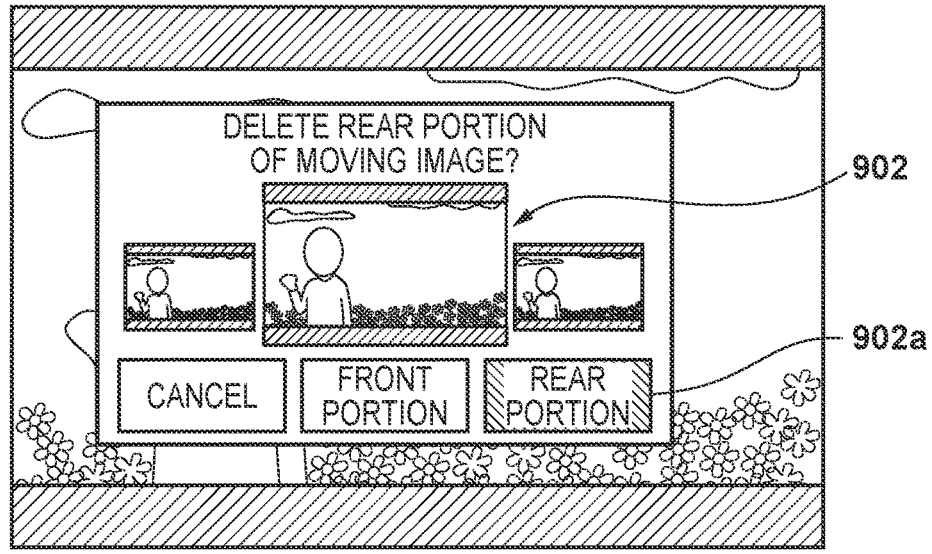

In step S616, the system control unit 50 displays an editing recommendation guide (guidance) on the display unit 28. Here, FIG. 9A is a diagram showing an example of the editing recommendation guide that is displayed on the display unit 28 in the present embodiment. An editing recommendation guide 901 such as shown in FIG. 9A can be displayed on the display unit 28 immediately after shooting a moving image to enable the user to select after shooting whether to immediately edit the moving image that has just been shot. In the case where editing is selected, display transitions directly to a moving image editing screen. FIG. 9B shows display in case there is a front-cut requirement flag for the moving image, and FIG. 9C shows display in case there is a rear-cut requirement flag for the moving image. Note that reference numeral 901 denotes an example showing display of the frame following the front-cut scheduled frame that is displayed in the editing recommendation guide, and reference numeral 902 is an example showing display of the frame preceding the rear-cut scheduled frame that is displayed in the editing recommendation guide. The frames from the frame located in the middle are included in the moving image. Therefore, in FIG. 9B, the middle frame and the frame to the right of the middle are included in the moving image, and the frame to the left of the middle is deleted. In FIG. 9C, the middle frame and the frame to the left of the middle are included in the moving image, and the frame to the right of the middle is deleted. In this way, by displaying the frames that are in proximity to the deleted frames, the user is able to check in detail which frames were included in the moving image and which frames were deleted. In step S617, the system control unit 50 may execute moving image editing processing which is described in FIGS. 14A and 14B.

Figure 14A:
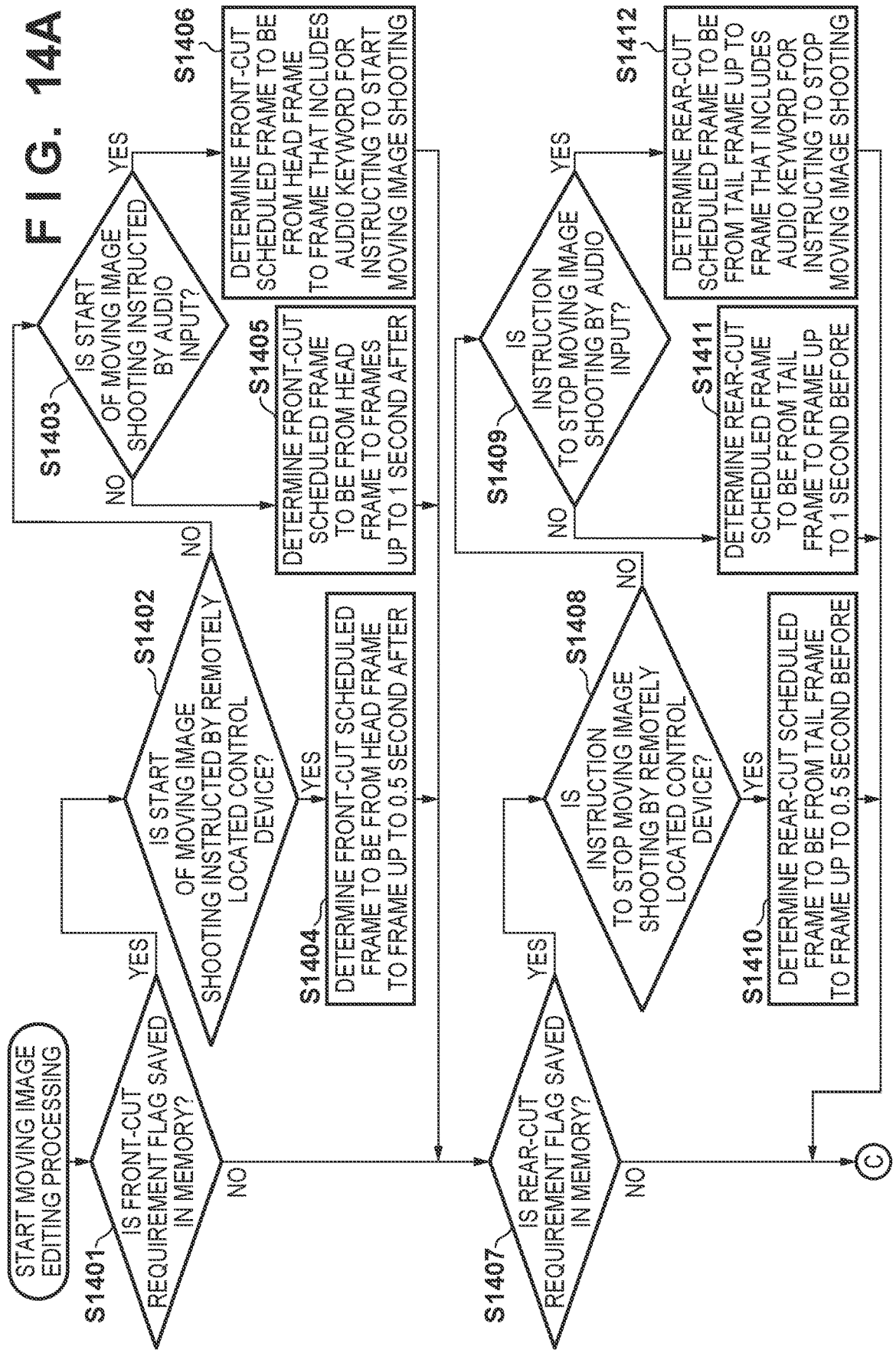

Hereinafter, the operations of the moving image editing processing in step S617 will be described, with reference to FIGS. 14A and 14B. FIGS. 14A and 14B are flowcharts that show operations from deciding the length of frames to be front-cut from the head of the moving image and rear-cut from the tail of the moving image until deletion in the present embodiment. FIGS. 10A to 10D are diagrams showing examples of moving image editing screen. Shortcut items that are displayed are changed according to whether there is a front-cut requirement flag or a rear-cut requirement flag. As will be described later using FIGS. 10A to 10D, in the case where there is a front-cut requirement flag, an item for performing a front-cut is displayed, and, in the case where there is a rear-cut requirement flag, an item for performing a rear-cut is displayed.

In step S617, the system control unit 50 executes moving image editing processing which will be described with FIGS. 11A and 11B or FIGS. 14A and 14B.

Figure 11A:
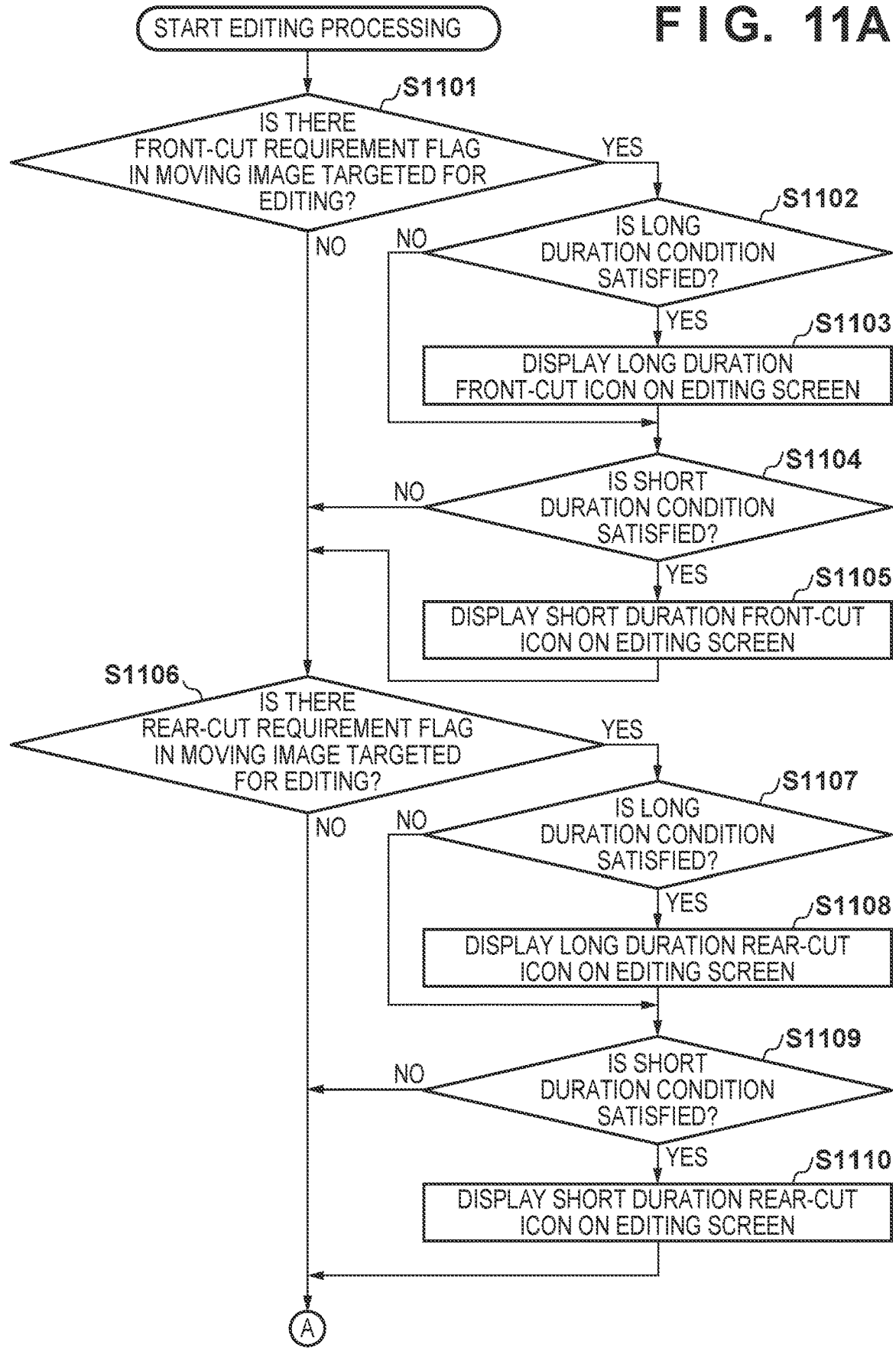
FIGS. 11A and 11B are flowcharts of moving image editing processing in one embodiment.
Figure 11B:
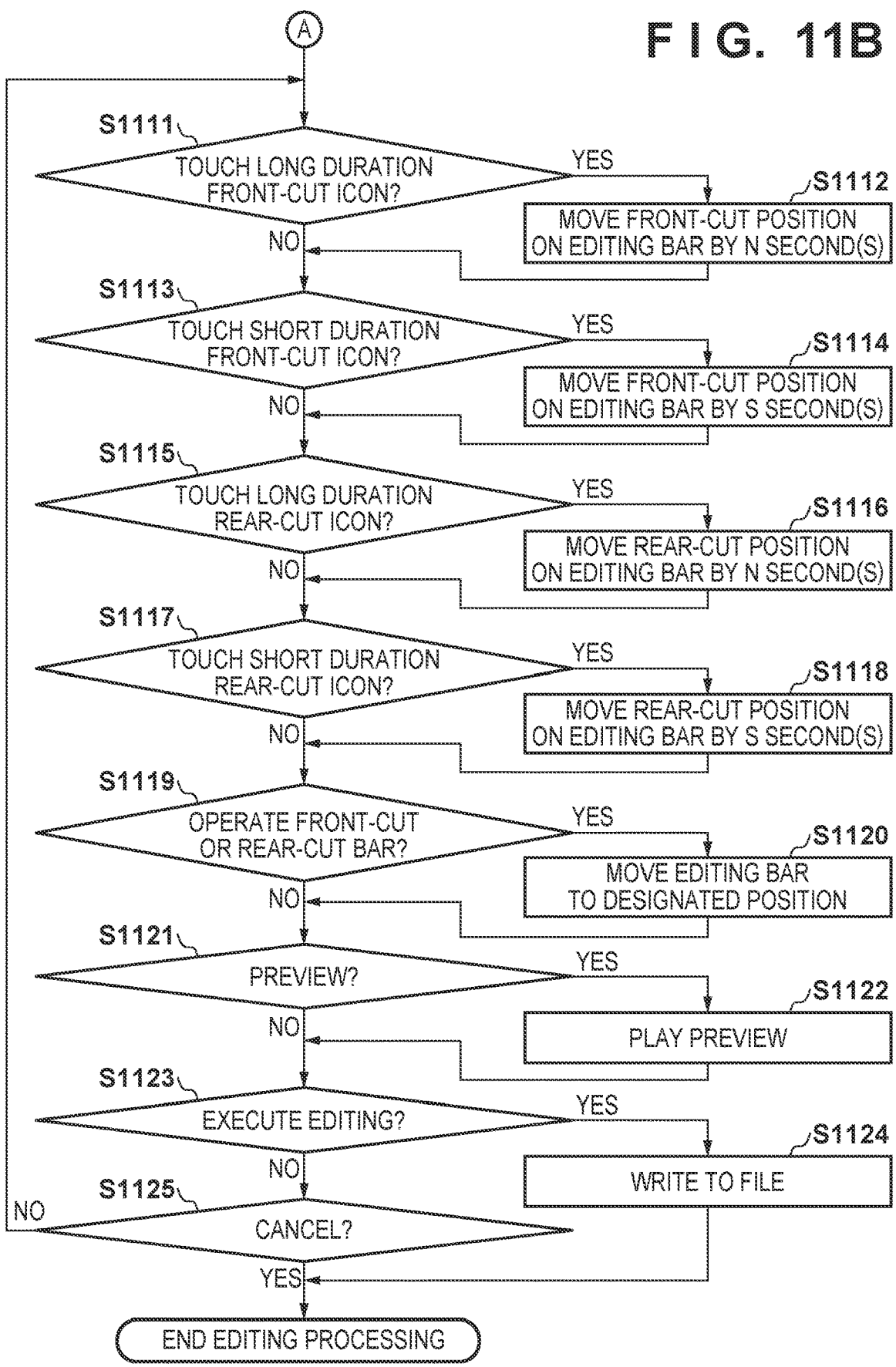

A series of flows of the moving image edit processing will be described, using FIGS. 11A and 11B. FIGS. 11A and 11B are flowcharts showing an example from when moving image edit processing is started and editing of the moving image is performed depending on whether there is a front-cut requirement flag or a rear-cut requirement flag until when the edited moving image is written to a file.

This processing is realized by a program recorded in the nonvolatile memory 56 being expanded in the system memory 52 and executed by the system control unit 50. Note that this processing is started when the digital camera 100 is powered on and the processing transitions to step S617.

In step S1101, the system control unit 50 determines whether there is a front-cut requirement flag for the moving image targeted for editing. If there is a front-cut requirement flag, the processing advances to step S1102, and if there is not, the processing advances to step S1106.

Figure 10A:
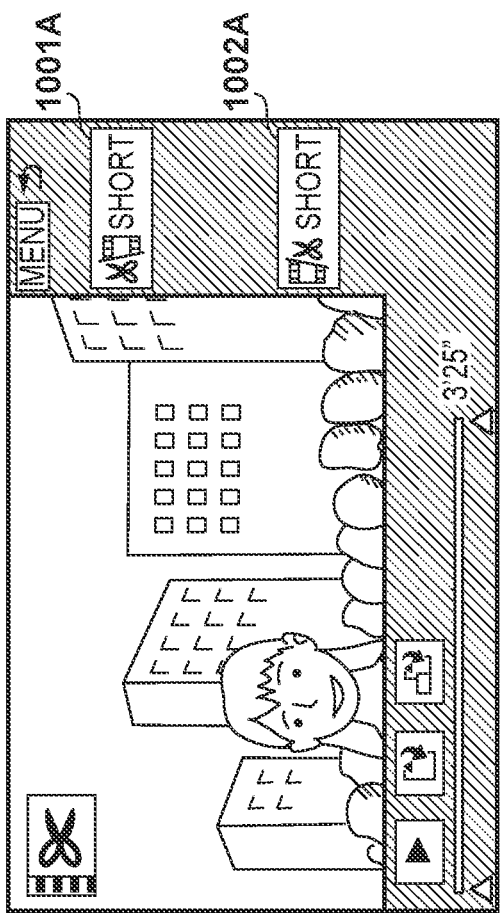
FIGS. 10A to 10D are diagrams showing a moving image editing screen in one embodiment.
Figure 10B:
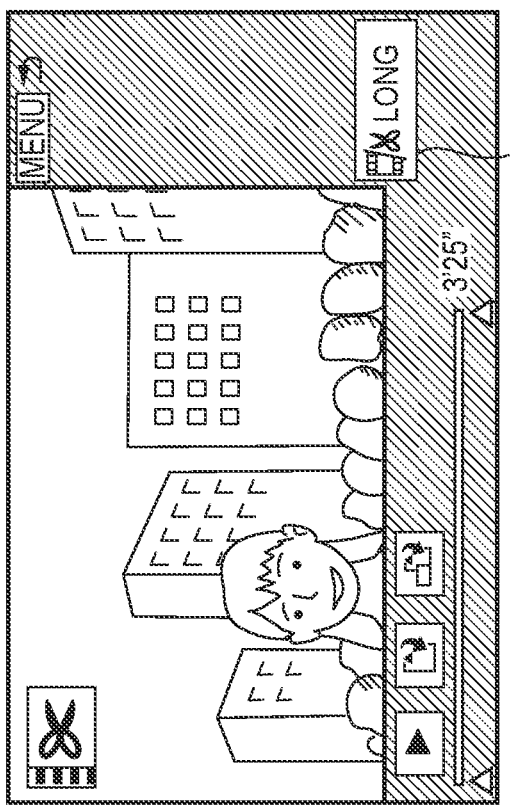
Figure 10C:
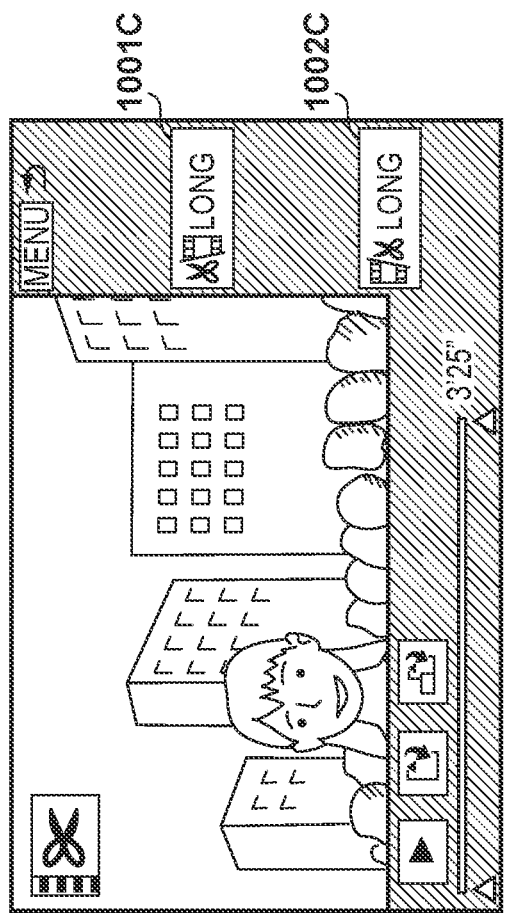

In step S1102, the system control unit 50 determines whether a long duration condition is satisfied. If the long duration condition is satisfied, the processing advances to step S1103, and a long duration front-cut item is displayed on the editing screen (FIG. 10C: 1001C). If the long duration condition is not satisfied, the processing advances to step S1104.

Figure 10D:
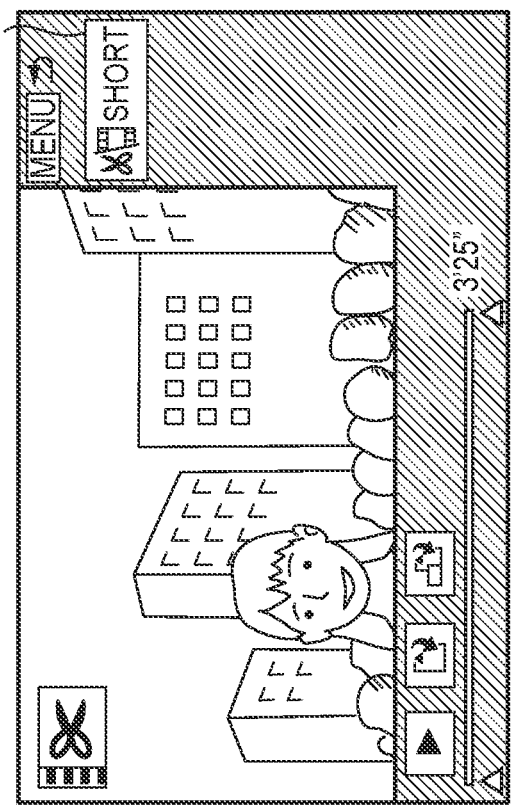

In step S1104, the system control unit 50 determines whether a short duration condition is satisfied. If the short duration condition is satisfied, the processing advances to step S1105, and a short duration rear-cut icon is displayed on the editing screen (FIG. 10A, FIG. 10D: 1001A, 1001D). If the short duration condition is not satisfied, the processing advances to step S1106. The long duration and the short duration will be defined later.

In step S1106, the system control unit 50 determines whether there is a rear-cut requirement flag for the moving image targeted for editing. If there is a rear-cut requirement flag, the processing advances to step S1107, and if there is not, the processing advances to step S1111.

In step S1107, the system control unit 50 determines whether the long duration condition is satisfied. If the long duration condition is satisfied, the processing advances to step S1108, and a long duration rear-cut icon is displayed on the editing screen (FIGS. 10B, 10C: 1001B, 1002C). If the long duration condition is not satisfied, the processing advances to step S1109.

In step S1109, the system control unit 50 determines whether the short duration condition is satisfied. If the short duration condition is satisfied, the processing advances to step S1110, and the short duration rear-cut icon is displayed on the editing screen (FIG. 10A: 1002A). If the short duration condition is not satisfied, the processing advances to step S1111. Hereinafter, the operations of the moving image editing processing in step S617 will be described, with reference to FIGS. 14A and 14B. FIGS. 14A and 14B are flowcharts showing the operations from deciding the length of frames to be front-cut from the head of the moving image and rear-cut from the tail of the moving image until deletion in the present embodiment.

In step S1401, the system control unit 50 determines whether a flag indicating that the front-cut requirement for editing by deleting a fixed number of frames from the head of the shot moving image is satisfied is stored in the memory 32. If the front-cut requirement flag for editing by deleting a fixed number of frames from the head of the shot moving image is recorded on the memory 32, the processing advances to step S1402, and if the front-cut requirement flag is not stored in the memory 32, the processing advances to step S1407.

In step S1402, the system control unit 50 determines whether the instruction method for starting moving image shooting was a moving image shooting start instruction from a remotely located control device such as a smartphone, a tablet PC, a desktop PC or a remote control. If the instruction method was an instruction for starting moving image shooting from a remotely located control device such as a smartphone, a tablet PC, a desktop PC and a remote control, the processing advances to step S1404, and if the instruction method was not a moving image shooting start instruction from a remotely located control device, the processing advances to step S1403.

In step S1403, the system control unit 50 determines whether the instruction method for starting moving image shooting was a moving image shooting start instruction given by audio input with the microphone 16. If the instruction method for starting moving image shooting was a start instruction given by audio input with the microphone 16, the processing advances to step S1406, and if the instruction method was not a start instruction given by audio input, the processing advances to step S1405. Note that a moving image shooting start instruction that does not correspond to a remotely located control device or audio input is envisaged to be touching the moving image touch item 401, pressing the moving image button 76, or the like.

In step S1404, the system control unit 50 decides the front-cut scheduled frames to be frames up to 0.5 seconds after the head frame, and deletes 0.5 seconds worth of frames starting from the head frame. Note that a configuration may be adopted in which information relating to frames to be deleted is stored in the memory 32, and the moving image from which frames have been deleted based on the information relating to deletion recorded in the memory 32 is output externally when uploaded to the Internet or moved to an external medium by the user.

In step S1405, the system control unit 50 decides the front-cut scheduled frames to be frames up to 1 second after the head frame, and deletes 1 second worth of frames starting from the head frame.

Note that, in the present embodiment, the front-cut scheduled frames are frames up to 0.5 seconds after the head frame in step S1404 and frames up to 1 second after the head frame in step S1405, but the present invention is not limited to these durations, and this time length may be changed or a configuration may be adopted in which the user is able to set the time length as appropriate.

In step S1406, the system control unit 50 decides the front-cut scheduled frames to be from the head frame to a frame that includes an audio keyword of the moving image shooting start instruction, and deletes frames from the head frame to the frame that includes the audio keyword.

In step S1407, the system control unit 50 determines whether a flag indicating that the rear-cut requirement for deleting a fixed number of frames from the tail of the shot moving image is satisfied is stored in the memory 32. If the flag indicating that the rear-cut requirement for deleting a fixed number of frames from the tail of the shot moving image is satisfied is stored in the memory 32, the processing advances to step S1408, and if the rear-cut requirement flag is not stored in the memory 32, the processing advances to step S1413.

In step S1408, the system control unit 50 determines whether the instruction method for stopping moving image shooting was a moving image shooting stop instruction from a remotely located control device such as a smartphone, a tablet PC, a desktop PC or a remote control. If the instruction method was a moving image shooting stop instruction from a remotely located control device such as a smartphone, a tablet PC, a desktop PC or a remote control, the processing advances to step S1410, and if the instruction method was not a moving image shooting stop instruction from a remotely located control device, the processing advances to step S1409.

In step S1409, the system control unit 50 determines whether the instruction method for stopping moving image shooting was an stop instruction given by audio input with the microphone 16. If the instruction method for stopping moving image shooting was a stop instruction given by audio input with the microphone 16, the processing advances to step S1412, and if the instruction method was not a stop instruction given by audio input, the processing advances to step S1411. Note that a moving image shooting stop instruction that does not correspond to either a remotely located control device or audio input is envisaged to be touching the moving image touch item 801, pressing the moving image button 76, or the like.

In step S1410, the system control unit 50 determines the rear-cut scheduled frames to be frames up to 0.5 seconds before the tail frame, and deletes 0.5 seconds worth of frames starting from the tail frame.

In step S1411, the system control unit 50 determines the rear-cut scheduled frames to be frames up to 1 second before the tail frame, and deletes 1 second worth of frames starting from the tail frame.

Note that, in the present embodiment, the rear-cut scheduled frames are frames up to 0.5 seconds before the tail frame in step S1410 and frames up to 1 seconds before the tail frame in step S1411, but the present invention is not limited to these durations, and this time length may be changed or a configuration may be adopted in which the user is able to set the time length as appropriate.

In step S1412, the system control unit 50 decides the rear-cut scheduled frames to be from the tail frame to a frame that includes an audio keyword of the moving image shooting stop instruction, and deletes frames from the tail frame to the frame that includes the audio keyword.

From step S1413 onward, processing for performing further editing on the moving image that has already undergone deletion is performed. For example, the position of frames to be deleted can be adjusted in the case where the user wants to change the length of the moving image to be deleted. Note that, until the user exits the editing screen, the moving image that has been partially deleted automatically and the moving image that has not been partially deleted are recorded to the recording medium 200. In response to exiting the editing screen, the moving image that has been partially deleted is recorded on the recording medium 200, and the moving image (moving image that was actually shot) that has not been partially deleted is deleted. Note that in the case where the portion of the moving image deleted automatically is separately recorded to the recording medium 200, and the portion of the moving image that is deleted is reduced according to an operation by the user which will be discussed later, a length desired by the user may be joined to the separately recorded moving image and recorded as a moving image.

In step S1413, the system control unit 50 determines whether a front-cut editing item 901a has been selected. If the front-cut editing item 901a has been selected, the processing advances to step S1414, and if the front-cut editing item 901a has not been selected, the processing advances to step S1417.

In step S1414, the system control unit 50 displays frames that are in proximity to the deleted frames on the editing recommendation guide.

In step S1415, the system control unit 50 determines whether an instruction for changing the front-cut position has been given. If an instruction for changing the front-cut position has been given, the processing advances to step S1416, and if this is not the case, the processing advances to step S1417. In the editing recommendation guide shown in FIGS. 9A to 9C, the user is able to change the frames to be deleted by scrolling sideways. For example, when the user scrolls to the right in FIG. 9B, the length of the moving image to be deleted becomes shorter than before scrolling. By adjusting the frames to be deleted, the user is able to include frames from a desired position in the moving image.

As will be discussed later, in the case where there is a front-cut requirement flag, the editing recommendation guide is displayed in a state where the item 901a for performing a front-cut is selected. By touching the set button or the item 901a in the state where the item 901a is selected, a front-cut (deletion of a predetermined time length of the moving image from a front part) can be performed at the designated frame position. Also, in the case where there is a rear-cut requirement flag, the editing recommendation guide is displayed in a state where the item 902a for performing a rear-cut is selected.

Note that, in a case where there is both a front-cut requirement flag and a rear-cut requirement flag, the editing recommendation guide is displayed in a state where one of these flags is selected. In the case where there is only the front-cut requirement flag and not the rear-cut requirement flag, the user is similarly able to select an item for performing a rear-cut, by moving a cursor using the operation unit 70.

Also, in the editing recommendation guide, the moving image of the portion to be deleted may be played back, or, in the case of a rear-cut, a portion from the end of the moving image after deletion (or a portion from the beginning in the case of a front-cut) may be played back.

In step S1416, the system control unit 50 front-cuts frames up to an instructed position starting from the head frame, and records the moving image to the recording medium 200.

In step S1417, the system control unit 50 determines whether a rear-cut editing item 902a has been selected. If the rear-cut editing item 902a has been selected, the processing advances to step S1418, and if the rear-cut editing item 902a has not been selected, this flow is ended.

In step S1418, the system control unit 50 displays frames that are in proximity to the deleted frames on the editing recommendation guide.

In step S1419, the system control unit 50 determines whether an instruction for changing the rear-cut position has been given. If an instruction for changing the rear-cut position has been given, the processing advances to step S1420, and if this is not the case, this flow is ended. In the editing recommendation guide shown in FIGS. 9A to 9C, the user is able to change the frames to be deleted by scrolling sideways. For example, when the user scrolls to be left in FIG. 9C, the length of the moving image to be deleted becomes shorter than before scrolling. By adjusting the frames to be deleted, the user is able to include frames from a desired position in the moving image.

As will be discussed later, in the case where there is a rear-cut requirement flag, the editing recommendation guide is displayed in a state where the item 902a for performing a rear-cut is selected. By touching the set button or the item 902a in the state where the item 902a is selected, a rear-cut (deletion of a predetermined time length of the moving image from a rear part) can be performed at the designated frame position. Also, in the case where there is a front-cut requirement flag, the editing recommendation guide is displayed in a state where the item 901a for performing a front-cut is selected.

Note that, in a case where there is both a front-cut requirement flag and a rear-cut requirement flag, the editing recommendation guide is displayed in a state where one of these flags is selected. In the case where there is only a rear-cut requirement flag and not a front-cut requirement flag, the user is able to select an item for performing a front-cut, by moving the cursor using the operation unit 70.

Also, in the editing recommendation guide, the moving image of the portion to be deleted may be played back, or, in the case of a front-cut, a portion from the beginning of the moving image after deletion (or a portion from the end in the case of a rear-cut) may be played back.

In step S1420, the system control unit 50 rear-cuts frames up to the instructed position from the tail frame, and records the moving image to the recording medium 200.

According to the embodiment described above, it becomes possible to easily delete the actions of the user instructing the start and end of moving image shooting that appear in the moving image when the user gives moving image shooting instructions from the subject side in the case of a selfie.

In the case where selfie moving image shooting is stopped, a rear portion of the moving image is deleted, and, furthermore, a front portion of the moving image is also deleted in the case where the start time is not by self-timer. In the case where shooting is started with a self-timer, a front portion of the moving image is not deleted, given that the actions of the user in instructing moving image start and in preparation are unlikely to appear in the moving image.

Note that, in the present embodiment, deletion of a moving image was described in steps S1404 to S1406 and step S1410 to S1412 of FIG. 14A, but a configuration may be adopted in which the span of the moving image to be deleted is recorded, and the actual deletion is not performed until instructed by the user. Also, the span of the moving image to be deleted may be displayed to the user in the editing recommendation guide. A configuration may be adopted in which the user is able to edit the span of the moving image to be deleted while viewing the length of time displayed in the editing recommendation guide.

In the present embodiment, unnecessary portions at the time of moving image shooting are deleted from the moving image, with these unnecessary portions at the time of moving image shooting being portions that show user operations for starting and ending shooting that the user does not want to include in the moving image, and consist mainly of preparations by the user to start or end shooting. Because operation on the digital camera 100 are carried out during shooting of the moving image in the case of the moving image end instruction, the user moving from his or her original position to the position of the digital camera 100 and further giving the moving image end instruction is included in the moving image. Also, in the case of the moving image start instruction, the user approaches the digital camera 100 and instructs the start of moving image shooting, before moving to a desired position and readying himself or herself for shooting, all of which is included in the moving image. In such cases, it is highly likely that the user will delete 10 to 15 seconds, for example, of start and end portions of the moving image. On the other hand, in the case of performing operating with a remote control, 2 to 5 seconds will be sufficient time for the user carry out the operations and hide the remote control.

In this way, the time from after having instructed the start of shooting to the portion in which unnecessary images do not actually appear changes depending on the means of starting and stopping shooting. For example, a configuration may be adopted in which the case where the moving image start/stop instruction is given by directly operating the digital camera 100 physically is set to a long duration, the case where the operations are performed with a remote control is set to a short duration, and a flag is attached at the image start and image stop times. Display of items for deleting a long duration moving image and display of items for deleting a short duration moving image on the editing screen may be changed depending on the flag.

In step S1111, the system control unit 50 determines whether a long duration front-cut icon (FIG. 10C: 1001C) has been touched by the user, and, if it is determined that a long duration front-cut icon has been touched, the processing advances to step S1112, and the front-cut position of the edit bar is moved N seconds. If a long duration front-cut icon (FIG. 10C: 1001C) has not been touched, the processing advances to step S1113. The long duration is a time of 10 or 15 seconds, for example.

In step S1113, the system control unit 50 determines whether a short duration front-cut icon (FIGS. 10A and 10D: 1001A, 1001D) has been touched by the user, and if it is determined that a short duration front-cut icon has been touched, the processing advances to step S1114, and the front-cut position of the edit bar is moved S seconds. If a short duration front-cut icon has not been touched (FIGS. 10A and 10D: 1001A, 1001D), the processing advances to step S1115. The short duration is a time of 2 or 5 seconds, for example.

In step S1115, the system control unit 50 determines whether a long duration rear-cut icon (FIGS. 10B and 10C: 1001B, 1002C) has been touched by the user, and if it is determined that a long duration rear-cut icon has been touched, the processing advances to step S1116, and the rear-cut position of the edit bar is moved N second. If a long duration rear-cut icon has not been touched (FIGS. 10B and 10C: 1001B, 1002C), the processing advances to step S1117.

In step S1117, the system control unit 50 determines whether a short duration rear-cut icon (FIG. 10A: 1002A) has been touched by the user, and it if is determined that a short duration rear-cut icon has been touched, the processing advances to step S1118, and the rear-cut position of the edit bar is moved S seconds. If a short duration rear-cut icon (FIG. 10A: 1002A) has not been touched, the processing advances to step S1119.

In step S1119, the system control unit 50 determines whether either the front-cut bar or the rear-cut bar has been operated by the user with respect to the moving image targeted for editing. If it is determined that one of these bars has been operated, the processing transitions to step S1120.

In step S1120, the system control unit 50 moves the edit bar to the position designated by the user. If the front-cut bar or the rear-cut bar has not been operated, the processing advances to step S1121.

In step S1121, the system control unit 50 determines whether a preview start instruction has been given by the user, and if it is determined that a preview start instruction has been given, preview playback of the moving image targeted for editing is performed. If step S1121 is Yes, the processing advances to step S1122, and preview playback of the edited moving image is performed. If this is not the case, the processing advances to step S1123.

In step S1123, the system control unit 50 determines whether an instruction for ending editing of the moving image targeted for editing has been given. If it determined that an instruction for ending editing has been given, the processing advances to step S1124, and the edited moving image is written to a file, and saved to the recording medium 200. If step S1123 is No, the processing advances to step S1125.

In step S1125, the system control unit 50 determines whether to cancel editing of the moving image targeted for editing. If it is determined to cancel editing, the moving image edit processing is ended without recording the moving image edited to that point, and if this is not the case, the processing returns to step S1111.

Figure 12A:
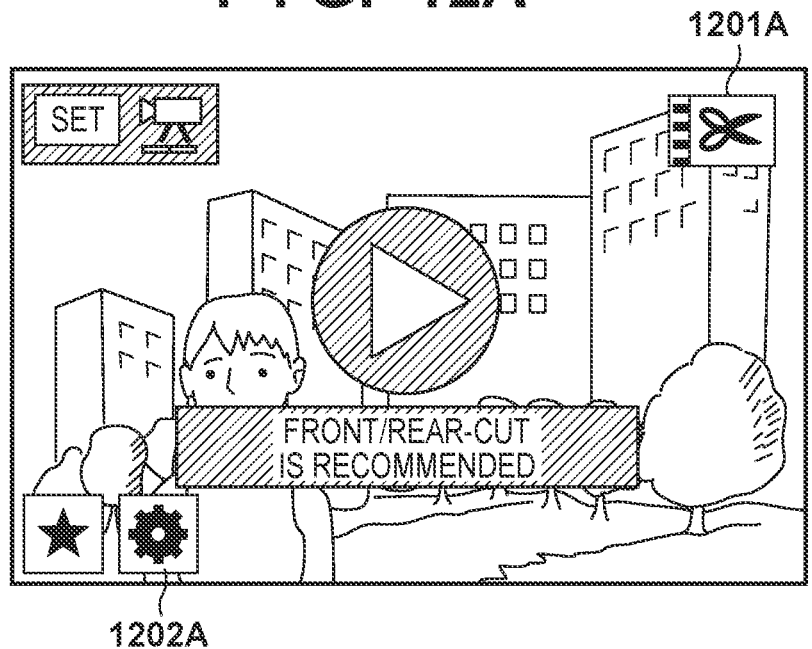
FIGS. 12A and 12B are diagrams showing a moving image playback screen in one embodiment.

In the case where cancel is selected on the screen of FIGS. 9A to 9C immediately after moving image shooting, the moving image can be edited from the playback screen. Since the front-cut requirement flag or the rear-cut requirement flag is stored for a moving image that is not edited immediately after shooting, guidance as shown in FIG. 12A is displayed. By pressing an item 1201A, the moving image editing screen can be displayed and the moving image can be edited.

When the item 1201A is pressed, the editing screen of FIGS. 10A to 10D is displayed on the display unit 28. The moving image can be edited, irrespective of whether there is a front-cut requirement flag or a rear-cut requirement flag. An item for transitioning to the moving image editing screen is prepared and displayed on the display unit 28.

Figure 12B:
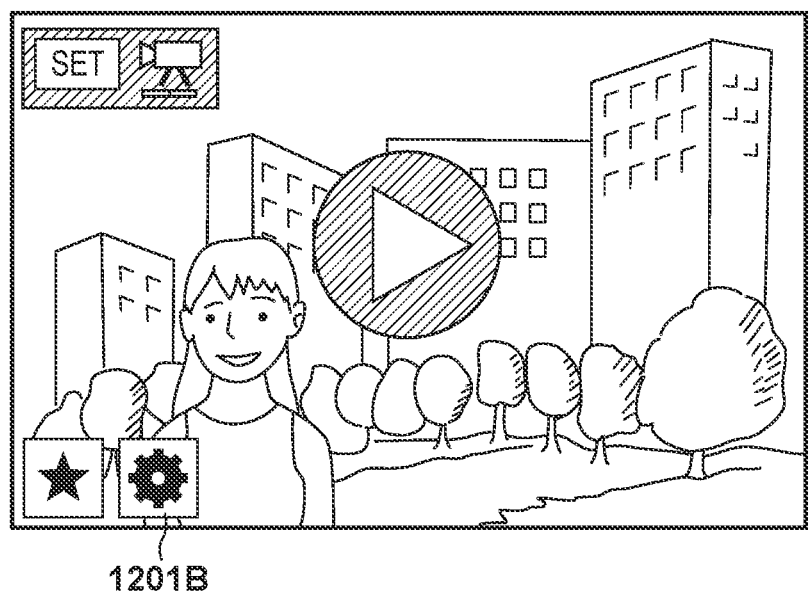

1202A in FIG. 12A is an example display of a moving image editing item in the case where there is the item 1201A indicating that there is a front-cut requirement flag and a rear-cut requirement flag, and 1201B in FIG. 12B is an example display of a moving image editing item in the case there is not a front-cut requirement flag or a rear-cut requirement flag. By pressing items 1202A and 1201B, display transitions to the moving image editing screen.

Figure 13:
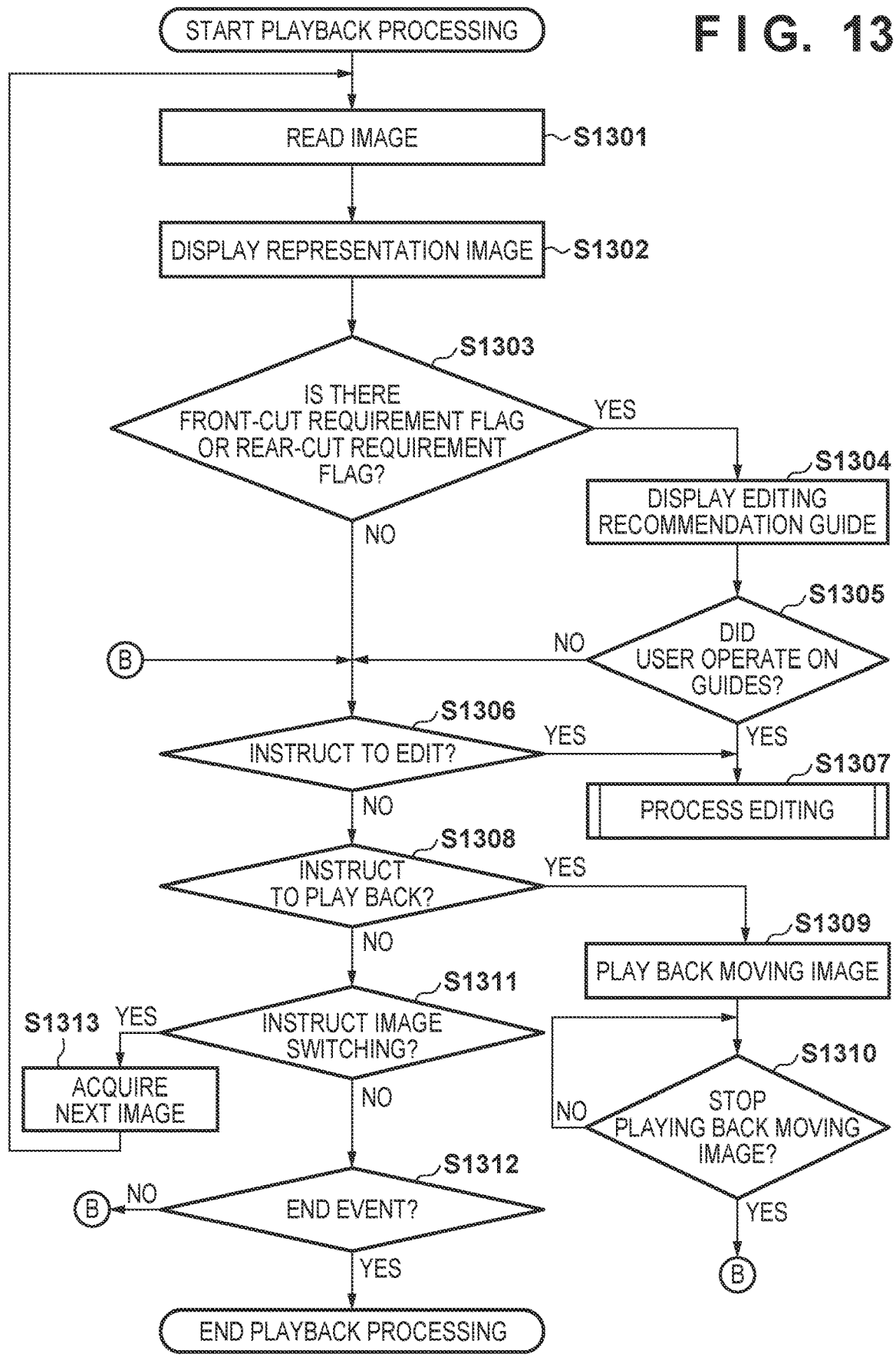
FIG. 13 is a flowchart showing playback edit processing in one embodiment.

The flow of processing in the case where a moving image for which a front-cut requirement flag or a rear-cut requirement flag is stored is displayed on the playback screen will be described with reference to the flowchart of FIG. 13.

This processing is realized by a program recorded in the nonvolatile memory 56 being expanded in the system memory 52 and executed by the system control unit 50. Note that this processing is started when the digital camera 100 is powered on and the processing shifts to the playback mode.

In step S1301, the system control unit 50 reads moving image data from the recording medium 200 to the memory 32.

In step S1302, the system control unit 50 causes the display unit 28 to display a representation image of the moving image that the user wants to edit.

In step S1303, the system control unit 50 determines whether the moving image data being displayed on the display unit 28 is information of a front-cut requirement flag or a rear-cut requirement flag. If there is a front-cut requirement flag or a rear-cut requirement flag, the processing advances to step S1304, and if there is not, the processing advances to step S1306.

In step S1304, the system control unit 50 displays an editing recommendation guide such as shown in FIG. 12A on the display unit 28.

If, in step S1305, the system control unit 50 judges that the editing item 1201A has been pressed by a user operation, the processing advances to step S1307. Edit processing is as shown by the operations of the flowchart in FIGS. 11A and 11B. If the editing item 1201A has not been pressed, the processing advances to step S1306. If a moving image is displayed on the display unit 28, the item 1202A for transitioning to the moving image editing screen is displayed.

If, in step S1306, the system control unit 50 judges that the item 1202A has been pressed, the processing transitions to step S1307, and, if it is judged that the item 1202A has not been pressed, the processing transitions to step S1308. If a moving image is displayed on the display unit 28, the moving image being displayed can be played back.

If, in step S1308, the system control unit 50 judges that a play button of the moving image has been pressed and there is a playback request for the moving image, the processing advances to step S1309, and the system control unit 50 plays back the moving image on the display unit 28. Playback of the moving image is continued until a playback stop operation of the moving image is performed in step S1310. When a stop operation of the moving image is performed, the processing returns to step S1306. If a playback instruction for the moving image is not given in step S1308, the processing advances to step S1311.

If, in step S1311, the system control unit 50 judges that there is a switching request for the moving image displayed on the display unit 28, the system control unit 50, in step S1313, expands the next image data from the record medium 200 in the memory 32, and displays an image on the display unit 28 in step S1301.

If, in step S1311, the system control unit 50 judges that an image switching instruction has not been given, the processing advances to step S1312.

If, in step S1312, the system control unit 50 judges that there is no request to end playback, the processing advances to step S1306, and if there is a request to end playback, playback processing is ended.

Performing processing as described above facilitates deletion of unnecessary portions of a moving image that show the user instructing the start and end of operations, such as a hand operating the camera or the user operating a remote control, when operating the main body at the time of taking a selfie to instruct moving image shooting.

Note that the various controls mentioned above that are described as being performed by the system control unit 50 may be performed by one piece of hardware, or overall control of the apparatus may be performed by sharing the processing between a plurality of pieces of hardware.

Also, although the present invention has been described in detail based on favorable embodiments thereof, the invention is not limited to these specific embodiments, and various modes in a range that does not depart from the spirit of the invention are also encompassed therein. Furthermore, the aforementioned embodiments are merely illustrative of the invention.

Also, the aforementioned embodiments were described, taking the case where the present invention is applied to a digital camera as an example, but the invention is not limited to this example, and is applicable to any apparatus capable of shooting moving images. That is, the present invention is applicable to a personal computer, a PDA, a mobile phone terminal, a tablet terminal, a smartphone, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140122, filed Jul. 30, 2019, and Japanese Patent Application No. 2019-140123, filed Jul. 30, 2019, which are hereby incorporated by reference herein in their entirety.

What is claimed is:

1. An image capture control apparatus comprising:
at least one processor or circuit configured to function as:
   a reception unit configured to receive an instruction for ending recording of a moving image captured by an image capturing device; and
   a control unit configured to, when the reception unit has received the instruction for ending recording of the moving image, perform control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, in response to an operation on the item, and perform control, in a case of a second shooting mode that differs from the first shooting mode, to not display the item, even when the instruction for ending recording of the moving image has been given.

2. An image capture control apparatus comprising:
at least one processor or circuit configured to function as:
a reception unit configured to receive an instruction for ending recording of a moving image captured by an image capturing device; and
a control unit configured to, when the reception unit has received the instruction for ending recording of the moving image, perform control, in a case of a first shooting mode in which an image captured with the image capturing device is displayed in a state being visible from a subject, to record the moving image together with data corresponding to information indicating to delete a portion of the moving image, being at least one of a portion at a beginning of the moving image and a portion at an end of the moving image, in response to the instruction for ending recording of the moving image being given, and perform control, in a case of a second shooting mode that differs from the first shooting mode, to not record the data together with the moving image, even when the instruction for ending recording of the moving image has been given.

3. The image capture control apparatus according to claim 2, wherein
the control unit displays, for a moving image with respect to which the data is recorded in a moving image editing screen, an item for deleting the portion at the beginning of the moving image or the portion at the end of the moving image.

4. An image capture control apparatus comprising:
at least one processor or circuit configured to function as:
a reception unit configured to receive an instruction for ending recording of a moving image captured by an image capturing device; and
a control unit configured to, when the reception unit has received the instruction for ending recording of the moving image, perform control, in a case where shooting by the image capturing device is shooting that satisfies a first condition, to display an item for deleting a portion at a beginning of the moving image, and perform control, in a case where shooting by the image capturing device is shooting that satisfies a second condition, to display an item for deleting a portion at an end of the moving image.

5. The image capture control apparatus according to claim 4, wherein
the first condition involves satisfying at least one of being self-shooting and being shooting without using a self-timer.

6. The image capture control apparatus according to claim 4, wherein
the second condition involves satisfying at least one of being self-shooting and being shooting of a moving image whose recording is stopped manually.

7. An image capture control apparatus comprising:
at least one processor or circuit configured to function as:
a reception unit configured to receive an instruction for ending recording of a moving image captured by an image capturing device; and
a control unit configured to, when the reception unit has received the instruction for ending recording of the moving image, perform control, in a case where shooting by the image capturing device is shooting that satisfies a first condition, to record the moving image together with data corresponding to information indicating to delete a portion at a beginning of the moving image, and perform control, in a case where shooting by the image capturing device is shooting that satisfies a second condition, to record the moving image together with data corresponding to information indicating to delete a portion at an end of the moving image.

8. The image capture control apparatus according to claim 7, wherein
the control unit displays, for a moving image with respect to which the data is recorded in a moving image editing screen, an item for deleting the portion at the beginning of the moving image or the portion at the end of the moving image.

9. An image capture control method comprising:
receiving an instruction for ending recording of a moving image captured by an image capturing device; and
when the instruction for ending recording of the moving image has been received in the receiving, performing control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, in response to an operation on the item, and performing control, in a case of a second shooting mode that differs from the first shooting mode, to not display the item, even when the instruction for ending recording of the moving image has been given.

10. An image capture control method comprising:
receiving an instruction for ending recording of a moving image captured by an image capturing device; and
when the instruction for ending recording of the moving image has been received in the receiving, performing control, in a case of a first shooting mode in which an image captured with the image capturing device is displayed in a state being visible from a subject, to record the moving image together with data corresponding to information indicating to delete a portion of the moving image, being at least one of a portion at a beginning of the moving image and a portion at an end of the moving image, in response to the instruction for ending recording of the moving image being given, and performing control, in a case of a second shooting mode that differs from the first shooting mode, to not record the data together with the moving image, even when the instruction for ending recording of the moving image has been given.

11. An image capture control method comprising:
receiving an instruction for ending recording of a moving image captured by an image capturing device; and
when the instruction for ending recording of the moving image has been received in the receiving, performing control, in a case where shooting by the image capturing device is shooting that satisfies a first condition, to display an item for deleting a portion at a beginning of the moving image, and performing control, in a case where shooting by the image capturing device is shooting that satisfies a second condition, to display an item for deleting a portion at an end of the moving image.

12. An image capture control method comprising:
receiving an instruction for ending recording of a moving image captured by an image capturing device; and
when the instruction for ending recording of the moving image has been received in the receiving, performing control, in a case where shooting by the image capturing device is shooting that satisfies a first condition, to record the moving image together with data corresponding to information indicating to delete a portion at a beginning of the moving image, and performing control, in a case where shooting by the image capturing device is shooting that satisfies a second condition, to record the moving image together with data corresponding to information indicating to delete a portion at an end of the moving image.

13. An image capture control method comprising:
receiving an instruction for ending recording of a moving image captured by an image capturing device; and
when the instruction for ending recording of the moving image has been received in the receiving, performing control, in a case of a first shooting mode in which an image captured with the image capturing device is displayed in a state being visible from a subject, to display an item for deleting a portion of the moving image, being at least one of a portion at a beginning of the moving image and a portion at an end of the moving image, in response to the instruction for ending recording of the moving image being given, and to record the moving image to a recording medium in a state where the portion of the moving image has been deleted, together with data corresponding to information indicating to delete the portion of the moving image, in response to an operation on the item, and performing control, in a case of a second shooting mode that differs from the first shooting mode, to not display the item and to not record the data together with the moving image, even when the instruction for ending recording of the moving image has been given.

14. An image capture control method comprising:
receiving an instruction for ending recording of a moving image captured by an image capturing device; and
when the instruction for ending recording of the moving image has been received in the receiving, performing control, in a case where shooting by the image capturing device is shooting that satisfies a first condition, to display an item for deleting a portion at a beginning of the moving image, and to record the moving image together with data corresponding to information indicating to delete the portion at the beginning of the moving image, and performing control, in a case where shooting by the image capturing device is shooting that satisfies a second condition, to display an item for deleting a portion at an end of the moving image, and to record the moving image together with data corresponding to information indicating to delete the portion at the end of the moving image.

15. An image capture control apparatus comprising:
at least one processor or circuit configured to function as:
a reception unit configured to receive an instruction for ending recording of a moving image captured with an image capturing device; and
a control unit configured to perform control, in a case of a first shooting mode in which an image captured with the image capturing device is displayed in a state being visible from a subject during shooting of the moving image, to delete a portion at an end of the shot moving image, in response to the reception unit receiving the instruction for ending recording of the moving image, and, in a case of a second shooting mode that differs from the first shooting mode, to not delete the portion at the end of the shot moving image, even when the reception unit has received the instruction for ending recording of the shot moving image.

16. An image capture control apparatus comprising:
at least one processor or circuit configured to function as:
a reception unit configured to receive an instruction for ending recording of a moving image captured with an image capturing device;
a self-timer unit configured to delay a recording start of the moving image by a set time period from an instruction for starting recording of the moving image; and
a control unit configured to perform control, in a case where shooting of the moving image is performed using the self-timer unit, to not delete a portion at a beginning of the shot moving image, and, in a case where shooting of the moving image is performed without using the self-timer unit, to delete the portion at the beginning of the shot moving image.

17. An image capture control apparatus comprising:
at least one processor or circuit configured to function as:
a reception unit configured to receive an instruction for ending recording of a moving image captured with an image capturing device; and
a self-timer unit configured to delay a recording start of the moving image by a set time period from an instruction for starting recording of the moving image; and
a control unit configured to perform control, in a case of a first shooting mode in which an image captured with the image capturing device is displayed in a state being visible from a subject during shooting of the moving image, to delete a portion at an end of the shot moving image, in response to the reception unit receiving the instruction for ending recording of the moving image, and, in a case of a second shooting mode that differs from the first shooting mode, to not delete the portion at the end of the shot moving image, even when the reception unit has received the instruction for ending recording of the shot moving image, and for performing control, in a case where shooting of the moving image is performed using the self-timer unit, to not delete a portion at a beginning of the shot moving image, and, in a case where shooting of the moving image is performed without using the self-timer unit, to delete the portion at the beginning of the shot moving image.

18. An image capture control method comprising:
receiving an instruction for ending recording of a moving image captured with an image capturing device; and
performing control, in a case of a first shooting mode in which an image captured with the image capturing device is displayed in a state being visible from a subject during shooting of the moving image, to delete a portion at an end of the shot moving image, in response to the instruction for ending recording of the moving image being received in the reception step, and, in a case of a second shooting mode that differs from the first shooting mode, to not delete the portion at the end of the shot moving image, even when the instruction for ending recording of the shot moving image has been received in the reception step.

19. An image capture control method comprising:
receiving an instruction for ending recording of a moving image captured with an image capturing device;
delaying a recording start of the moving image by a set time period from an instruction for starting recording of the moving image; and
performing control, in a case where shooting of the moving image is performed using the delaying, to not delete a portion at a beginning of the shot moving image, and, in a case where shooting of the moving image is performed without using the delaying, to delete the portion at the beginning of the shot moving image.

20. An image capture control method comprising:
receiving an instruction for ending recording of a moving image captured with an image capturing device;
delaying a recording start of the moving image by a set time period from an instruction for starting recording of the moving image; and
performing control, in a case of a first shooting mode in which an image captured with the image capturing device is displayed in a state being visible from a subject during shooting of the moving image, to delete a portion at an end of the shot moving image, in response to the instruction for ending recording of the moving image being received in the receiving, and, in a case of a second shooting mode that differs from the first shooting mode, to not delete the portion at the end of the shot moving image, even when the instruction for ending recording of the shot moving image has been received in the receiving, and for performing control, in a case where shooting of the moving image is performed using the delaying, to not delete a portion at a beginning of the shot moving image, and, in a case where shooting of the moving image is performed without using the delaying, to delete the portion at the beginning of the shot moving image.

* * * * *